US008885546B2

(12) United States Patent
Myojo

(10) Patent No.: US 8,885,546 B2
(45) Date of Patent: Nov. 11, 2014

(54) CONTROL STATION APPARATUS AND CONTROL METHOD THEREOF, COMMUNICATION APPARATUS AND CONTROL METHOD THEREOF, AND WIRELESS COMMUNICATION SYSTEM

(71) Applicant: Canon Kabushiki Kaisha, Tokyo (JP)

(72) Inventor: Toshihiko Myojo, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/914,036

(22) Filed: Jun. 10, 2013

(65) Prior Publication Data

US 2013/0273835 A1 Oct. 17, 2013

Related U.S. Application Data

(63) Continuation of application No. 11/942,177, filed on Nov. 19, 2007, now Pat. No. 8,483,115.

(30) Foreign Application Priority Data

Nov. 22, 2006 (JP) .................................. 2006-316325

(51) Int. Cl.
| | |
|---|---|
| H04J 3/08 | (2006.01) |
| H04B 7/15 | (2006.01) |
| H04B 7/155 | (2006.01) |
| H04W 16/26 | (2009.01) |
| H04W 8/00 | (2009.01) |
| H04W 88/04 | (2009.01) |

(52) U.S. Cl.
CPC .............. *H04B 7/15* (2013.01); *H04B 7/15542* (2013.01); *H04W 88/04* (2013.01); *H04W 16/26* (2013.01); *H04W 8/005* (2013.01)
USPC .......................................... 370/315; 370/468

(58) Field of Classification Search
CPC ...... H04W 88/04; H04W 16/26; H04W 8/005
USPC .................................. 370/315, 468
See application file for complete search history.

(56) References Cited

U.S. PATENT DOCUMENTS 7,194,262 B2   3/2007   Aoki et al.
(Continued)

FOREIGN PATENT DOCUMENTS

DE          10027115 A1     12/2001
(Continued)

OTHER PUBLICATIONS

D. J. Shyy, "Cooperative Relay Protocol for 802.16j", IEEE 802.16 Presentation Submission Template (Rev.8.3.), XP-002477154, Nov. 7, 2006.
(Continued)

*Primary Examiner* — Sai-Ming Chan
(74) *Attorney, Agent, or Firm* — Carter, DeLuca, Farrell & Schmidt, LLP

(57) ABSTRACT

A control station apparatus performs wireless communication with a plurality of communication apparatuses and sends data to the communication apparatuses. The control station apparatus receives, from each of the communication apparatuses, identification information of other communication apparatuses with which the communication apparatus is capable of wireless communication; selects, from among the plurality of communication apparatuses, at least one relay apparatus that relays transmission of the data, based on the received identification information; determines a communication timing for the relaying performed by the selected relay apparatus; and notifies the selected relay apparatus of an instruction to perform data relay and the communication timing. The control station selects the relay apparatus so that a communication apparatus that receives the data from the control station apparatus via two or more transmission paths is present.

8 Claims, 30 Drawing Sheets

(56) References Cited

U.S. PATENT DOCUMENTS

| | | | |
|---|---|---|---|
| 2001/0041566 A1* | 11/2001 | Xanthos et al. | 455/423 |
| 2002/0071435 A1* | 6/2002 | Bolgiano et al. | 370/394 |
| 2003/0016767 A1* | 1/2003 | Houtman | 375/326 |
| 2003/0124976 A1* | 7/2003 | Tamaki et al. | 455/15 |
| 2004/0192304 A1 | 9/2004 | Casaccia et al. | |
| 2005/0030930 A1* | 2/2005 | Cho et al. | 370/338 |
| 2007/0002766 A1 | 1/2007 | Park et al. | |
| 2008/0045220 A1* | 2/2008 | Ishii et al. | 455/438 |

FOREIGN PATENT DOCUMENTS

| | | |
|---|---|---|
| EP | 1170901 A2 | 1/2002 |
| JP | 2000-022671 A | 1/2000 |
| JP | 2003-037606 A | 2/2003 |
| JP | 2003-332977 A | 11/2003 |
| JP | 2005-236632 A | 9/2005 |
| JP | 2005-354626 A | 12/2005 |
| JP | 2006-287538 A | 10/2006 |
| JP | 2006-295813 A | 10/2006 |
| JP | 2007-515843 A | 6/2007 |
| WO | 2004/102891 A1 | 11/2004 |
| WO | 2005/125127 A | 12/2005 |

OTHER PUBLICATIONS

Wang et al, "Data Forwarding and Routing Path Setup for IEEE 802.16j Multihop Relay Networks", Internet Citation, [Online], Nov. 9, 2006, XP002430258, pp. 1-10.

Kang et al, IEEE 802.16 "Proposed Technical Requirements Guideline for IEEE 802.16j (Mobile Multihop Relay)," Oct. 11, 2006, XP002477153, pp. 1-9.

Pabst, et al, "Relay-Based Deployment Concepts for Wireless and Mobile Broadband Radio", XP11119469, IEEE Communications Magazine, Sep. 2004, pp. 80-89.

Takatani et al, "Introducing the Concept of Mobile Ad Hoc Network to 802.16j, Consideration of Technical Requirements," Jul. 3, 2006, XP002465374, pp. 1-11.

Larsson et al, "Multiuser Diversity Forwarding in Multihop Packet Radio Networks", Mar. 13, 2005, XP0791518, IEEE Communications Society/WCNC-2005, pp. 2188-2194.

Kaneko et al, "Proposed Relay Method With P-MP Structure of IEEE802.16/2004", Sep. 11, 2005 XP010926479, 2005 IEEE 16th International Symposium on Personal, Indoor and Mobile Radio Communications, pp. 1606-1610.

European Patent Office Communication concerning EP Patent Application No. 07022594.1 with search report dated May 2, 2008.

Japanese Office Action issued in corresponding application No. 2012-153987 on Aug. 23, 2013.

* cited by examiner

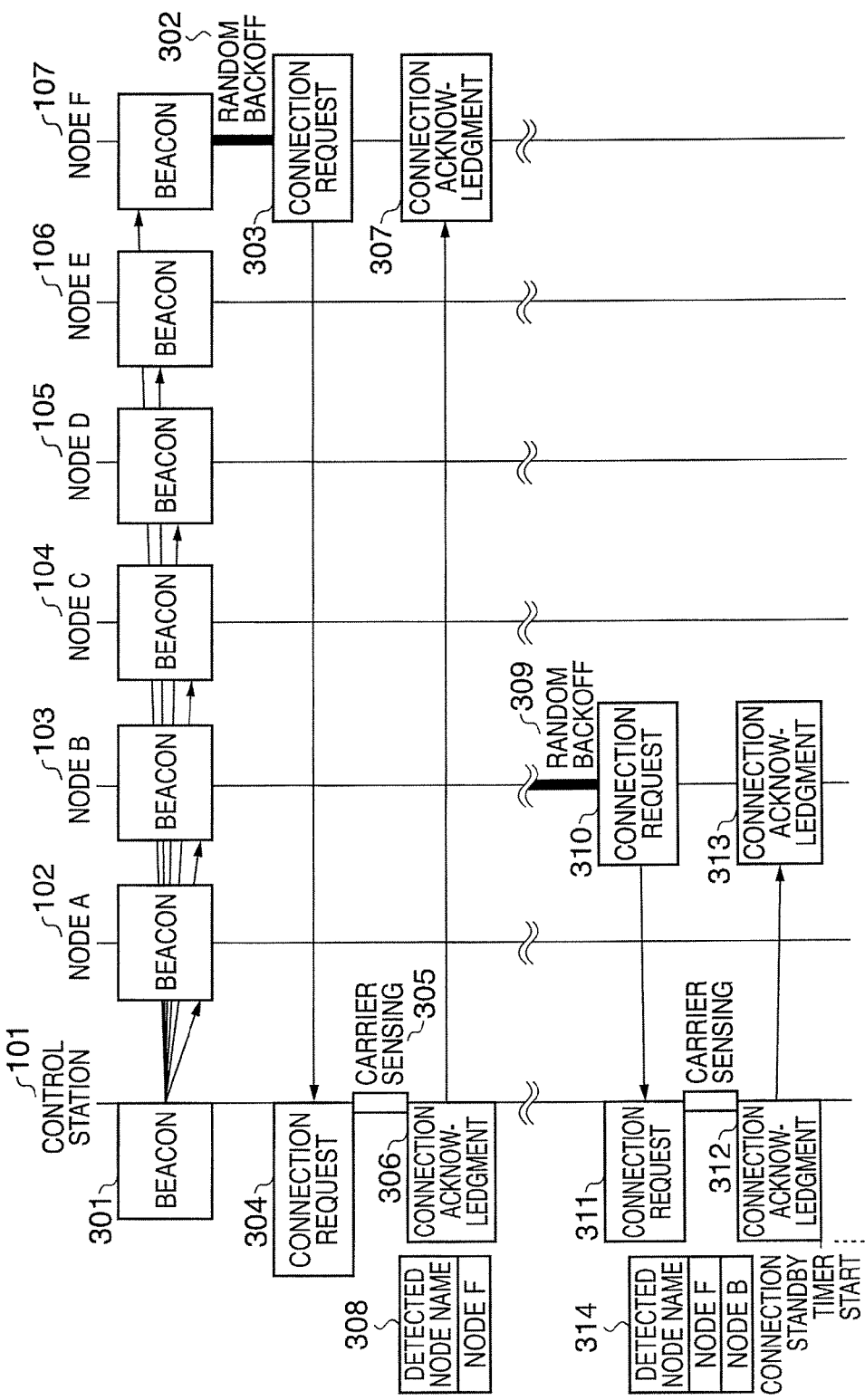

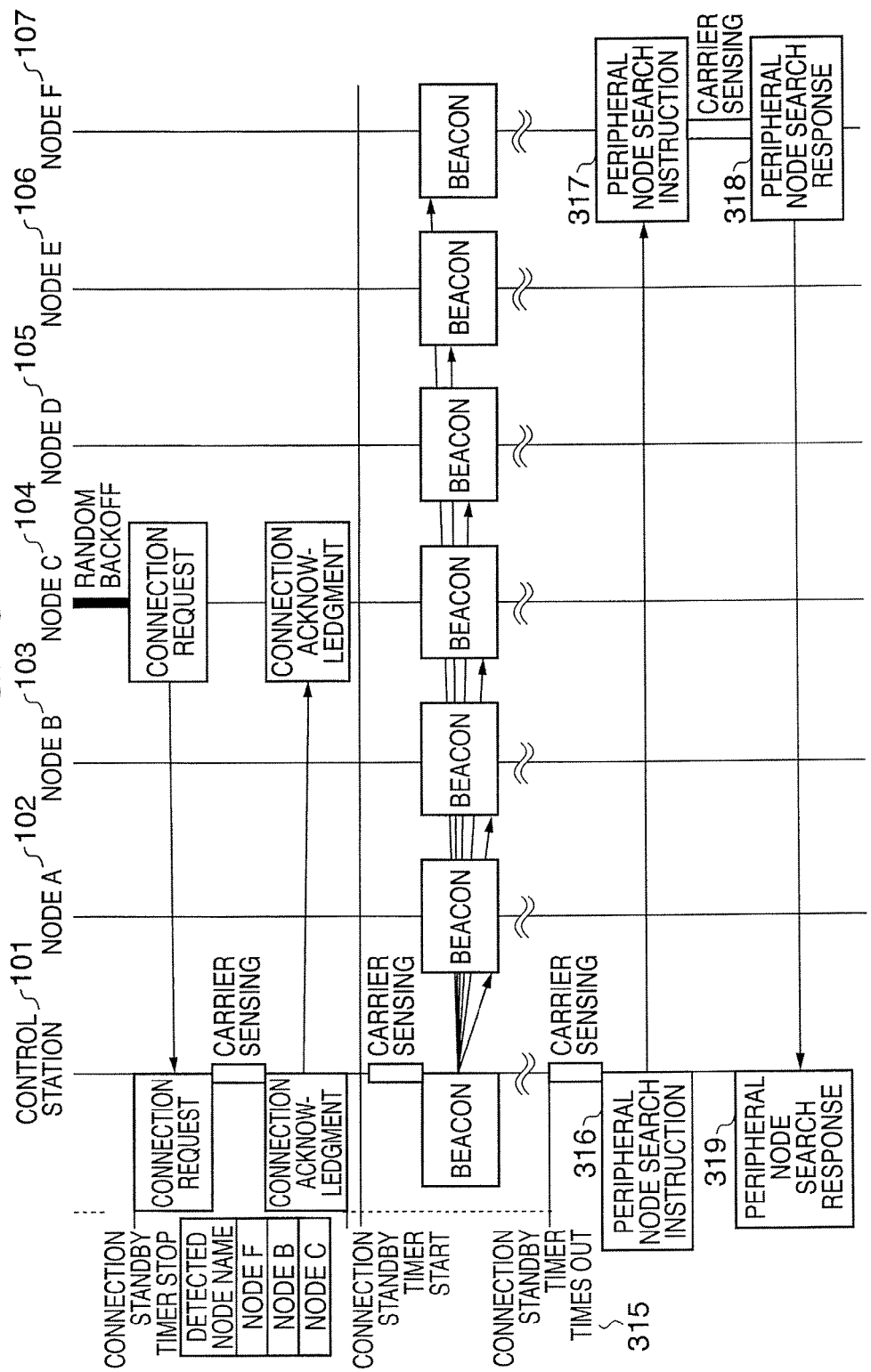

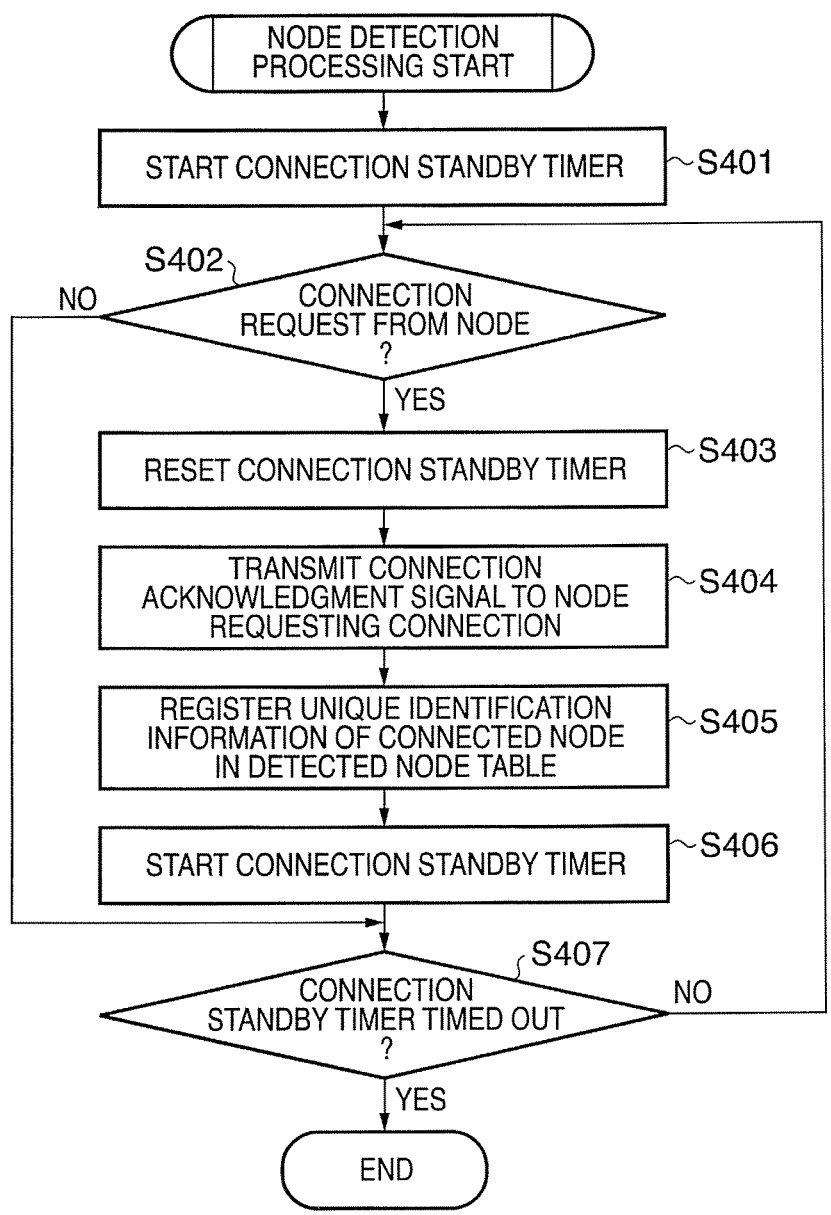

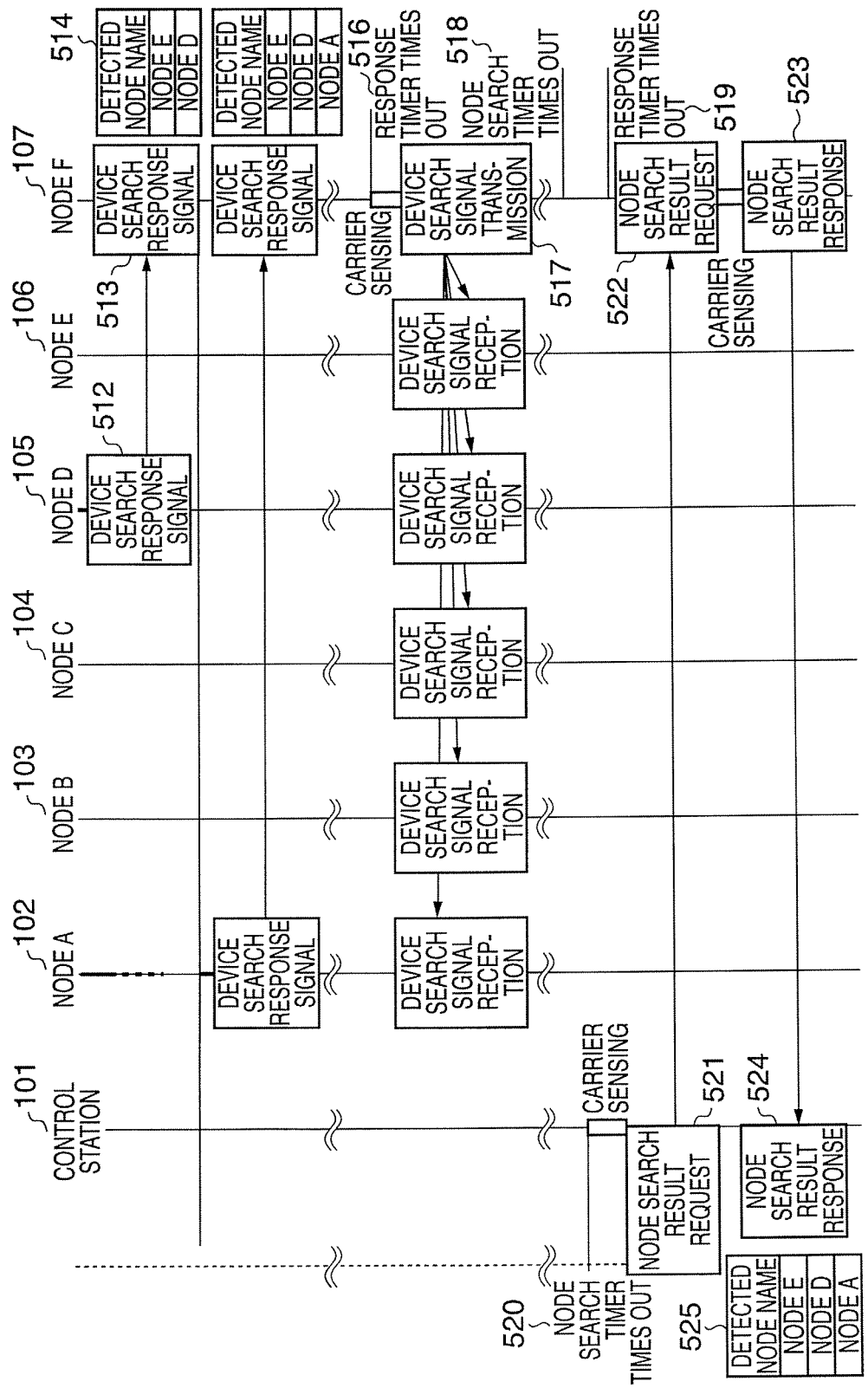

FIG. 7

| | 102 | 103 | 104 | 105 | 106 | 107 |
|---|---|---|---|---|---|---|
| NODE NAME | NODE A | NODE B | NODE C | NODE D | NODE E | NODE F |
| NODES CAPABLE OF COMMUNICATION | NODE B | NODE A | NODE A | NODE A | NODE A | NODE A |
| | NODE C | NODE C | NODE B | NODE E | NODE B | NODE D |
| | NODE D | NODE E | NODE E | NODE F | NODE C | NODE E |
| | NODE E | | | | NODE D | |
| | NODE F | | | | NODE F | |

F I G. 11

| NODE NAME | NODE A | NODE E | NODE F | NODE B | NODE C | NODE D |
|---|---|---|---|---|---|---|
| NODES CAPABLE OF COMMUNI- CATION | NODE B (1) | NODE A (1) | NODE A | NODE A (2) | NODE A | NODE A |
| | NODE C (1) | NODE B (2) | NODE D | NODE C (3) | NODE B | NODE E |
| | NODE D (1) | NODE C (2) | NODE E | NODE E (2) | NODE E | NODE F |
| | NODE E (1) | NODE D (2) | | | | |
| | NODE F (1) | NODE F (2) | | | | |

Column headers: 102, 106, 107, 103, 104, 105

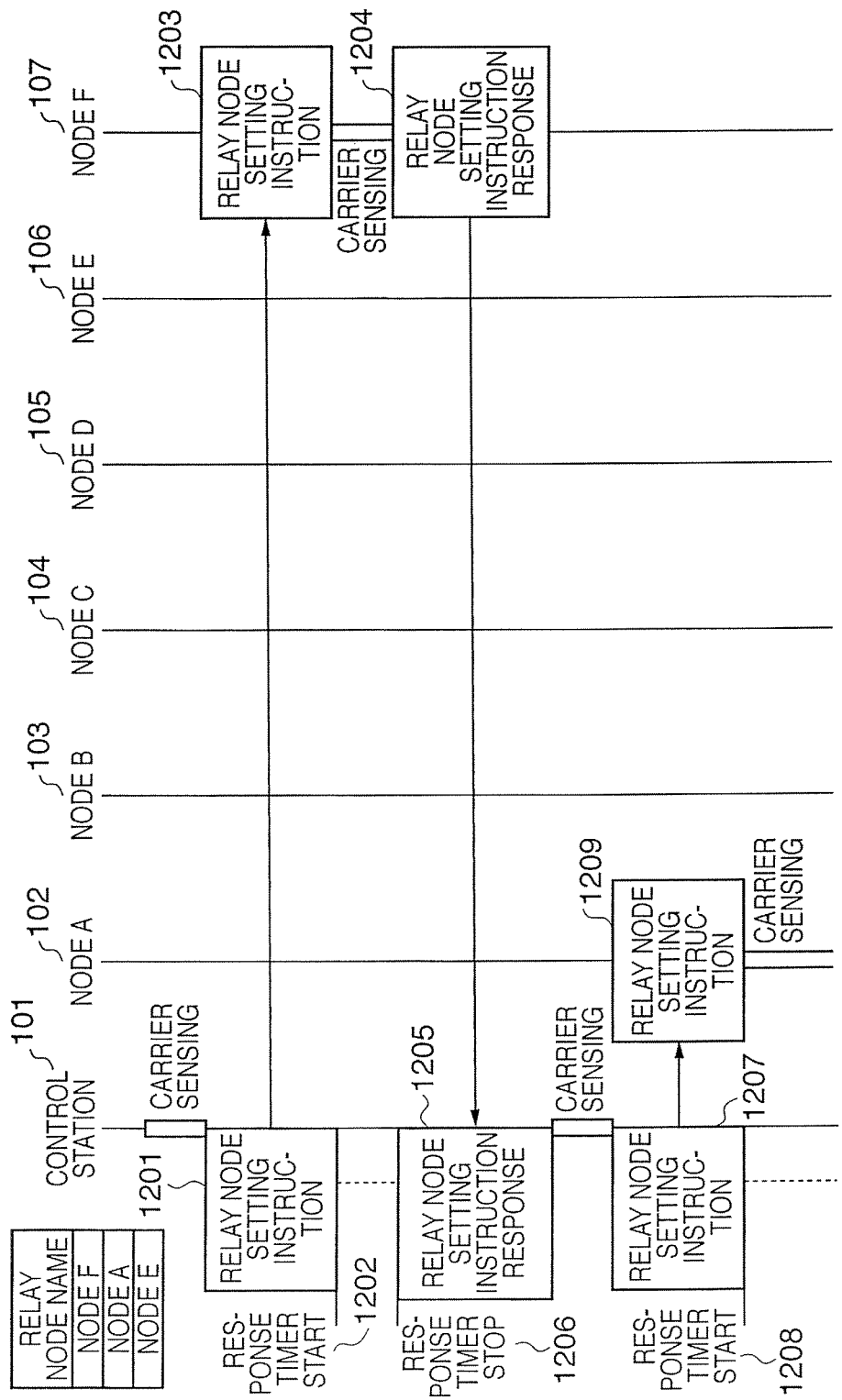

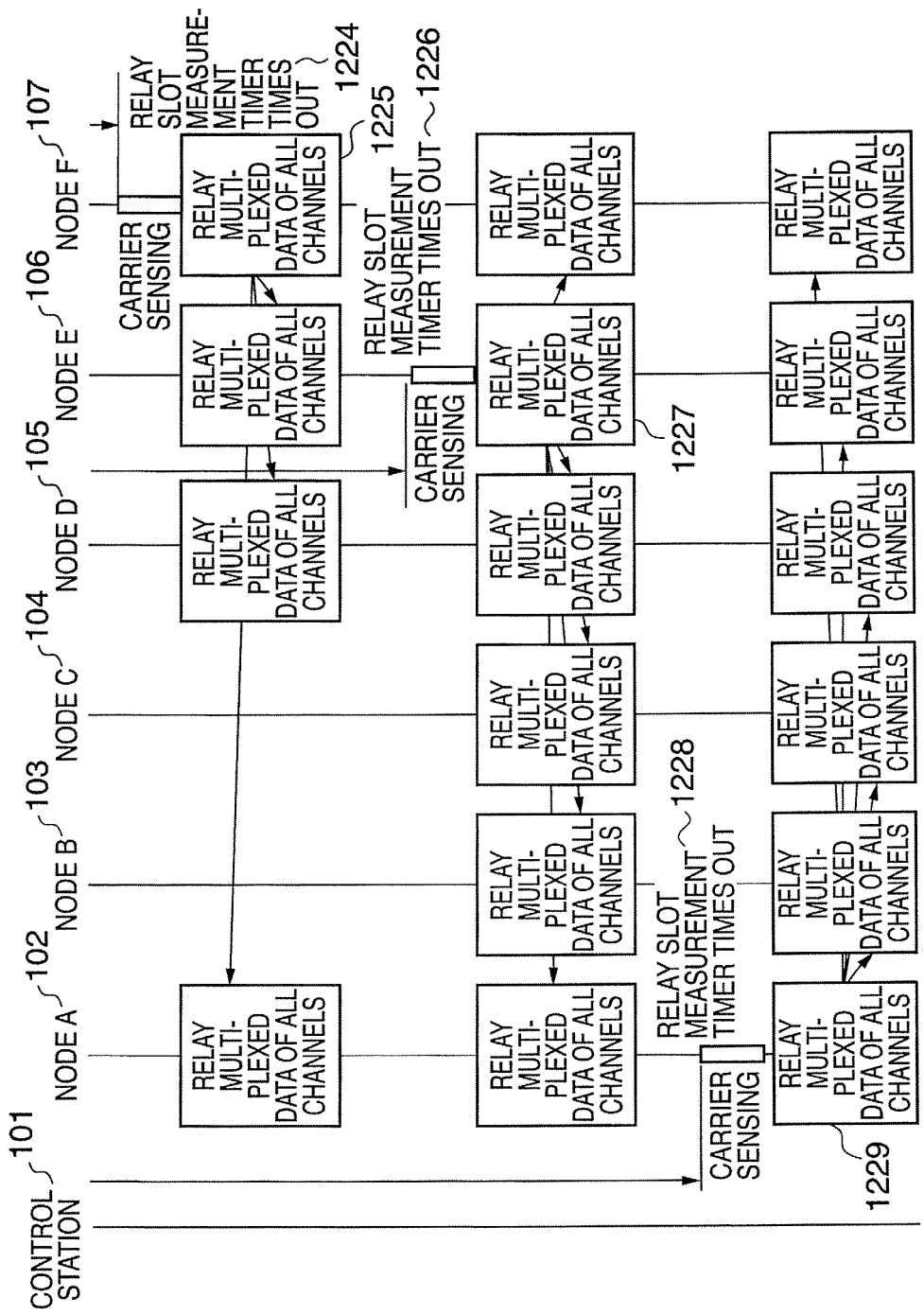

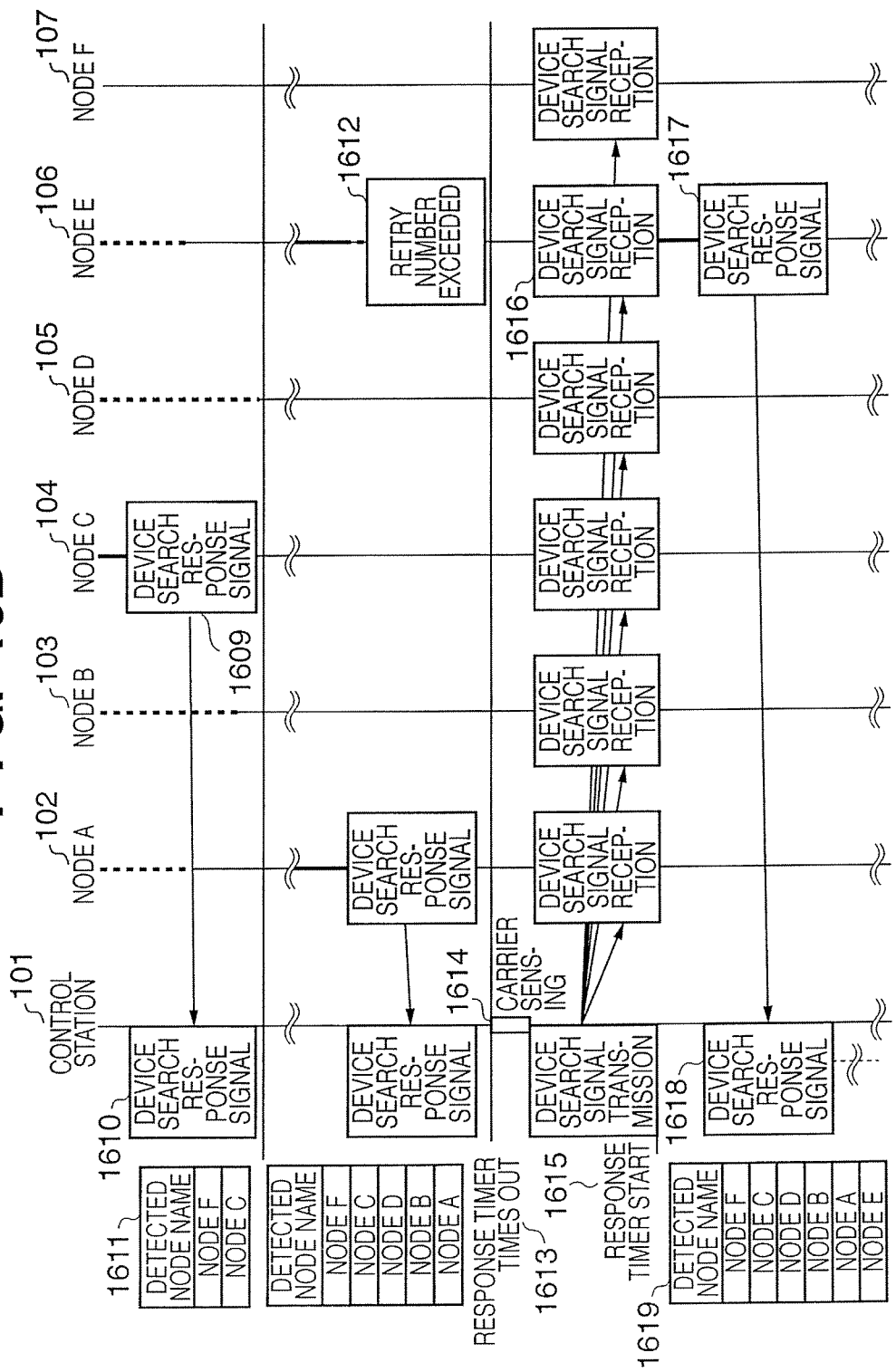

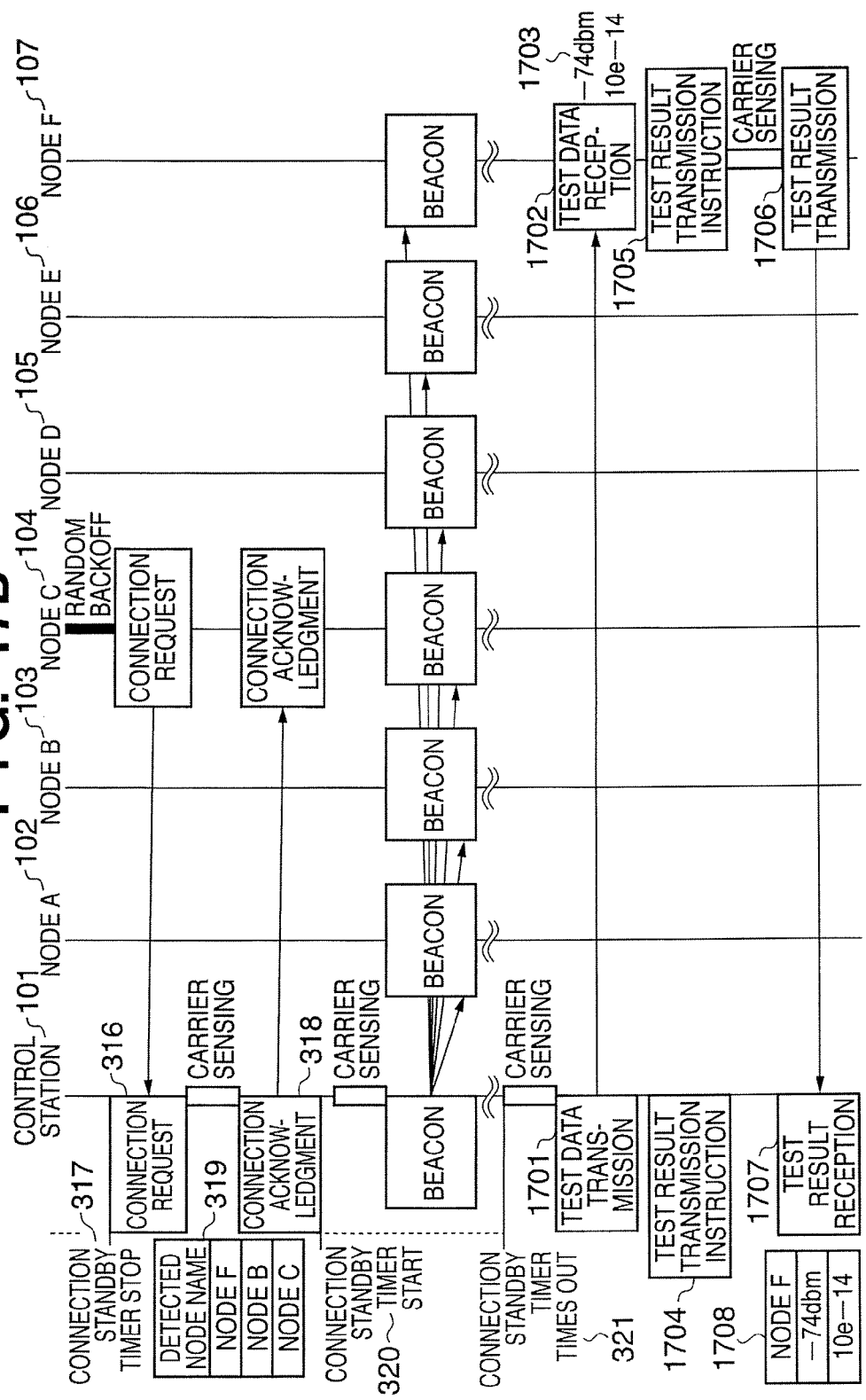

F I G. 18

|  | | 102 | 103 | 104 | 105 | 106 | 107 |
|---|---|---|---|---|---|---|---|
| | NODE NAME | NODE A | NODE B | NODE C | NODE D | NODE E | NODE F |
| 1801 | RECEPTION ELECTRIC FIELD INTENSITY | −50dbm | −55dbm | −60dbm | −63dbm | −71dbm | −74dbm |
| 1802 | ERROR RATE | 10e−14 | 10e−13 | 10e−13 | 10e−14 | 10e−12 | 10e−14 |

CONTROL STATION APPARATUS AND CONTROL METHOD THEREOF, COMMUNICATION APPARATUS AND CONTROL METHOD THEREOF, AND WIRELESS COMMUNICATION SYSTEM

BACKGROUND OF THE INVENTION

1. Field of the Invention

The present invention relates to a control station apparatus and a control method thereof, a communication apparatus and a control method thereof, and a wireless communication system.

2. Description of the Related Art

As a conventional scheme that transmits data in a stable manner between devices connected via a communication path, a scheme is known in which plural wireless stations that relay data on transmission paths between devices are disposed, and relay transmission paths are realized over plural paths (for example, see Japanese Patent Laid-Open No. 2005-236632). Additionally, a scheme that causes a wireless terminal station to operate as a relay station rather than using a dedicated relay station is known as a scheme for carrying out relay transmission (for example, see Japanese Patent Laid-Open No. 2003-332977).

Furthermore, a scheme that transmits the same data plural times in order to realize an improvement in the reliability of the data to be transmitted through redundant data transmission is known (for example, see Japanese Patent Laid-Open No. 2000-22671). In particular, as a method for transmitting data, a scheme that controls plural transmissions of broadcast or multicast data to which retransmission control cannot be applied is known (for example, see Japanese Patent Laid-Open No. 2003-37606).

With the method that configures plural paths using the conventional relay transmission path, the state of traffic on the transmission path and the connection status of the line are confirmed, and in the case where a problem has arisen in the transmission path, the data transmission is carried out on plural pre-set paths (Japanese Patent Laid-Open No. 2005-236632). However, in this configuration, the transmission path is switched after the occurrence of a problem on the transmission path has been detected. For this reason, there is a problem that when transmitting stream data, which has a short period of validity (lifetime), communication is momentarily interrupted, and transmission cannot be carried out correctly. There is another problem that when performing transmission of stream data synchronized with plural devices from a data transmitting device, different transmission paths are set for each device, and thus the time at which the data will reach the devices cannot be guaranteed.

Furthermore, there is a method in which a terminal station connected to a control station detects other terminal stations with which communication is possible; after this, a representative relay terminal is determined and a terminal group configured, whereby data is transmitted and relayed from the control station to terminals under the control of the representative relay terminal (Japanese Patent Laid-Open No. 2003-332977). This method also proposes causing the frequencies used by the control station and the terminal group to match, whereby the terminal station that correctly receives data relays the data to the representative relay terminal in the case where the representative relay terminal could not correctly receive the data. However, in this configuration, the data transmitted to the terminal station under control of the terminal group terminates once at the representative relay terminal, whereupon the representative relay terminal performs transfer control that includes retransmission. For this reason, in the case where retransmission control is undertaken between the control station and the representative relay terminal, a significant delay occurs in the transmission of data between the control station and the terminal. There is another problem that a procedure is necessary for the terminal station to be aware that the representative relay terminal has failed in receiving the data, in the case where the terminal station carried out relays; accordingly, an excess control procedure arises in addition to the normal communication process, and the transmission delay increases even more. There is yet another problem that a procedure for switching retransmission control among terminal stations with which the control station does not communicate directly is also necessary, and thus the control becomes complicated.

Within the redundant data transmission method, there is a technique in which the same packet is transmitted multiple times, the received packets are compared, and the optimum packet is selected as a result of a majority decision (Japanese Patent Laid-Open No. 2000-22671). There is also a method that suppresses needless transmission by controlling the number of transmissions in accordance with the status of the system (Japanese Patent Laid-Open No. 2003-37606). However, there is a problem with this method in that the effects of this method cannot be obtained when the wireless transmission path is temporarily unable to carry out communication, in the case where the same packet is transmitted plural times between terminals.

SUMMARY OF THE INVENTION

Having been conceived in light of the abovementioned problems, the present invention provides a technique that prevents data loss stemming from changes in the communication environment and that is capable of transmitting data wirelessly with high reliability, in a system in which data is transmitted wirelessly from a control station to plural communication apparatuses.

According to one aspect of the present invention, a control station apparatus that performs wireless communication with a plurality of communication apparatuses and sends data to the plurality of communication apparatuses, the control station apparatus comprises:

a receiving unit adapted to receive, from each of the communication apparatuses, identification information of other communication apparatuses with which the communication apparatus is capable of wireless communication;

a selection unit adapted to select, from among the plurality of communication apparatuses, at least one relay apparatus that relays transmission of the data, based on the received identification information;

a determination unit adapted to determine a communication timing for the relaying performed by the relay apparatus selected by the selection unit; and a notification unit adapted to notify the relay apparatus selected by the selection unit of an instruction to perform data relay and the communication timing;

wherein the selection unit selects the relay apparatus so that a communication apparatus that receives the data from the control station apparatus via two or more transmission paths is present.

According to another aspect of the present invention, a communication apparatus used in a wireless communication system that includes a plurality of communication apparatuses and a control station apparatus that sends data to the plurality of communication apparatuses, the communication apparatus comprises:

a sending unit adapted to send, to the control station apparatus, identification information of other communication apparatuses with which the communication apparatus is capable of wireless communication;

a data receiving unit adapted to receive the data from the other communication apparatuses or the control station apparatus; and a sending control unit adapted to control sending of the received data in accordance with the communication timing in the case where the control station apparatus has notified the communication apparatus of a data relay instruction and the communication timing at which the relay is to be performed.

According to still another aspect of the present invention, a wireless communication system comprises a plurality of communication apparatuses and a control station apparatus that sends data to the plurality of communication apparatuses, wherein the control station apparatus includes:

a receiving unit adapted to receive, from each of the communication apparatuses, identification information of other communication apparatuses with which the communication apparatus is capable of wireless communication;

a selection unit adapted to select, from among the plurality of communication apparatuses, at least one relay apparatus that relays transmission of the data, based on the received identification information;

a determination unit adapted to determine a communication timing for the relaying performed by the relay apparatus selected by the selection unit; and a notification unit adapted to notify the relay apparatus selected by the selection unit of an instruction to perform data relay and the communication timing, and each of the communication apparatuses includes:

a sending unit adapted to send the identification information to the control station apparatus;

a data receiving unit adapted to receive the data from the other communication apparatuses or the control station apparatus; and a sending control unit adapted to control sending of the received data in accordance with the communication timing in the case where the data relay instruction and the communication timing has been notified, and the selection unit selects the relay apparatus so that the communication apparatus that receives the data from the control station apparatus via two or more transmission paths is present.

According to yet another aspect of the present invention, a control method for a control station apparatus that performs wireless communication with a plurality of communication apparatuses and sends data to the plurality of communication apparatuses, the control method comprises:

a step of receiving in which a receiving unit receives, from each of the communication apparatuses, identification information of other communication apparatuses with which the communication apparatus is capable of wireless communication;

a step of selecting in which a selection unit selects, from among the plurality of communication apparatuses, at least one relay apparatus that relays transmission of the data, based on the received identification information;

a step of determining in which a determination unit determines a communication timing for the relaying performed by the relay apparatus selected in the step of selecting; and a step of notifying in which a notification unit notifies the relay apparatus selected in the step of selecting of an instruction to perform data relay and the communication timing, wherein in the step of selecting, the selecting is performed so that a communication apparatus that receives the data from the control station apparatus via two or more transmission paths is present.

According to still yet another aspect of the present invention, a control method for a communication apparatus used in a wireless communication system that includes a plurality of communication apparatuses and a control station apparatus that sends data to the plurality of communication apparatuses, the control method comprises:

a step of sending in which a sending unit sends, to the control station apparatus, identification information of other communication apparatuses with which the communication apparatus is capable of wireless communication;

a step of receiving data in which a data receiving unit receives the data from the other communication apparatuses or the control station apparatus; and a step of controlling sending in which a sending control unit controls sending of the received data in accordance with the communication timing in the case where the control station apparatus has notified the communication apparatus of a data relay instruction and the communication timing at which the relay is to be performed.

Further features of the present invention will become apparent from the following description of exemplary embodiments (with reference to the attached drawings).

BRIEF DESCRIPTION OF THE DRAWINGS

FIGS. 3A and 3B are sequence diagrams illustrating a sequence through which a control station detects nodes.

FIG. 4 is a flowchart illustrating node detection processing, the execution of which is controlled by a control unit of the control station.

FIGS. 5A and 5B are sequence diagrams illustrating a sequence through which a node searches for peripheral nodes capable of wireless communication in response to an instruction from the control station.

FIG. 7 is a diagram illustrating an example of an information table that shows the results of a peripheral node search carried out by each node saved in a memory of the control station.

FIG. 11 is a diagram illustrating an example of a restructured information table that shows the results of each node searching for peripheral nodes.

FIGS. 12A-12C are sequence diagrams illustrating data transmission and relay transmission operations performed by the control station and nodes.

FIGS. 16A-16C are sequence diagrams illustrating another method through which a control station detects nodes.

FIGS. 17A and 17B are sequence diagrams illustrating a procedure for measuring the communication quality between the control terminal and nodes after the control station has detected the nodes.

FIG. 18 is a communication quality measurement result table showing results of the measurement of communication quality.

DESCRIPTION OF THE EMBODIMENTS

Hereinafter, embodiments of the present invention shall be described in detail with reference to the appended drawings. Note that the constituent elements denoted in the following embodiments are only examples, and the scope of the present invention is not intended to be limited thereto.

<First Embodiment>

Hereinafter, the configurations and control operations of a control station (control station apparatus) and terminal stations (communication apparatuses; denoted as "nodes" hereinafter) of the present embodiment shall be described with reference to FIGS. 1 through 16.

Figure 1:
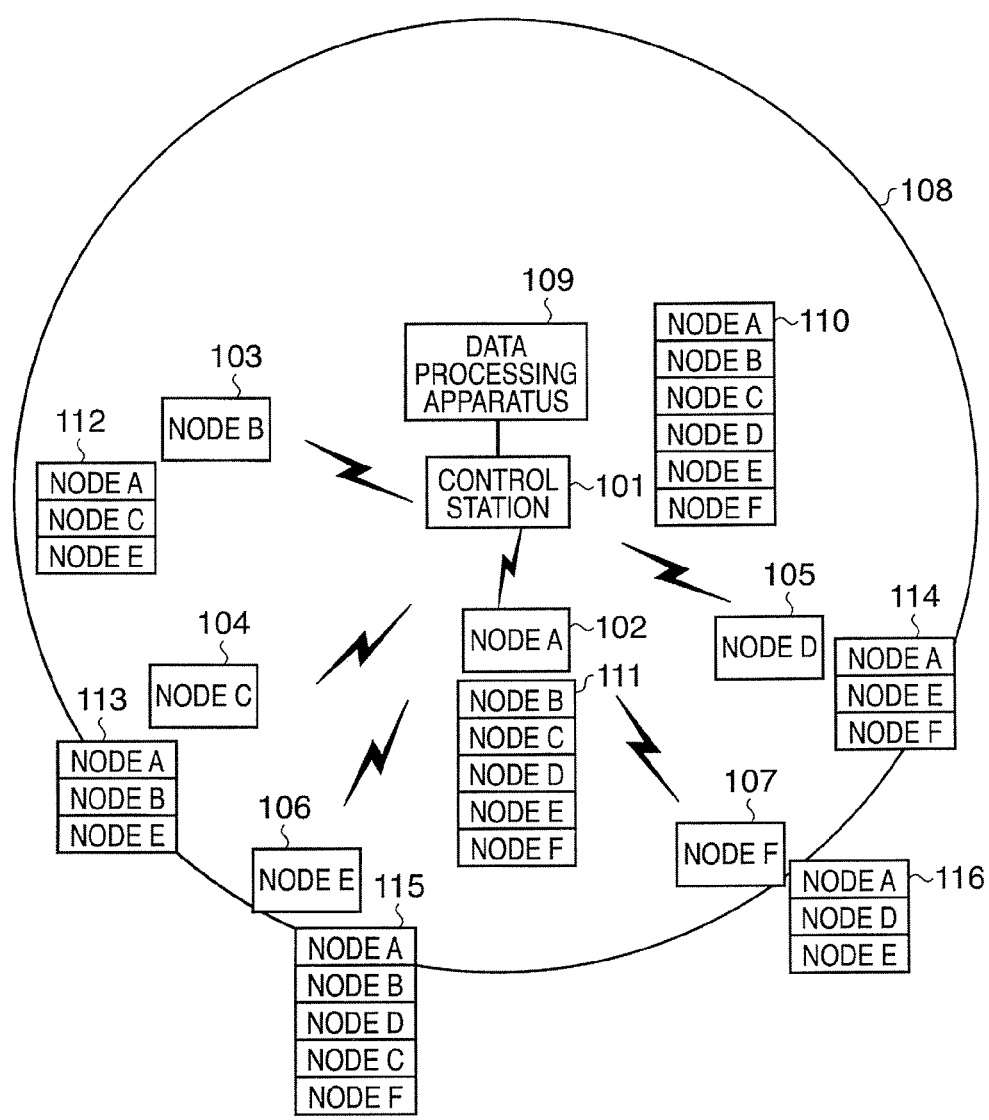
FIG. 1 is a diagram illustrating an example of the configuration of a control station and nodes.

FIG. 1 is a diagram illustrating an example of the configuration of a control station and nodes according to the present embodiment. In FIG. 1, 101 is a control station that executes processing for generating a redundant communication path (a transmission path that passes through a relay apparatus) according to the present embodiment. 102 to 107 are individual nodes capable of operating as relay nodes. 108 is the wireless communication range of the control station 101. 109 is a data processing apparatus that generates data to be transmitted to each of the nodes. 110 to 116 are tables showing the nodes capable of wireless communication with each node.

Figure 2A:
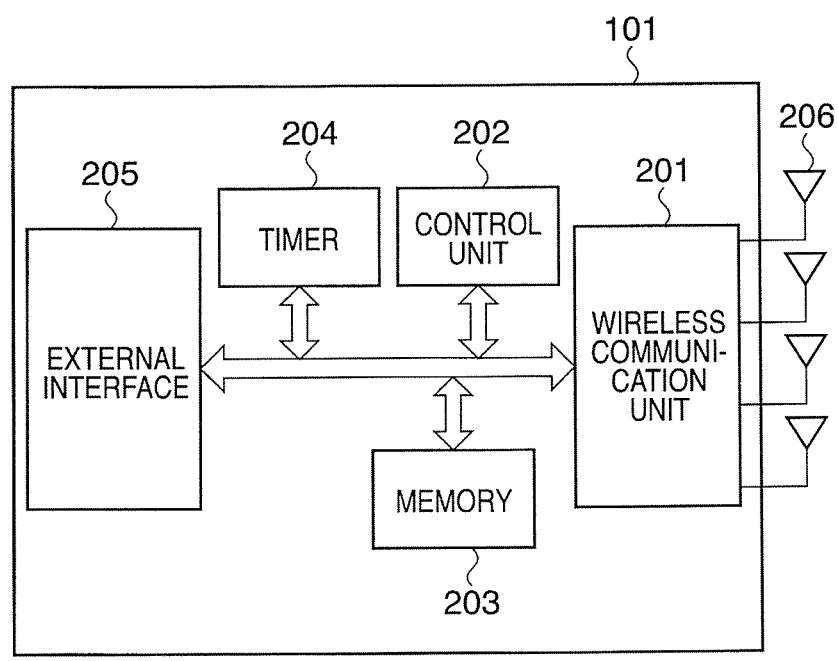
FIG. 2A is a block diagram illustrating a configuration of a control station.
Figure 2B:
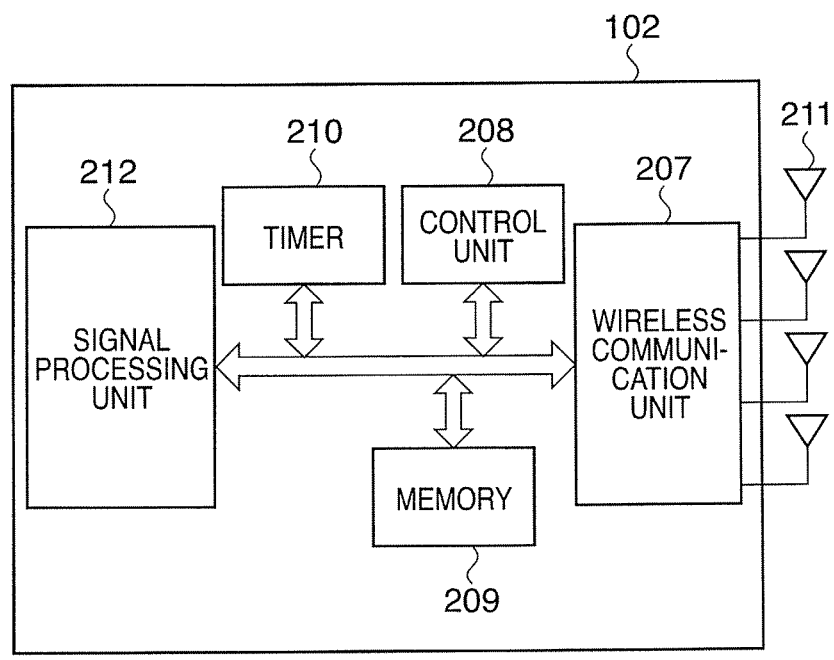
FIG. 2B is a block diagram illustrating a configuration of a node.

FIG. 2A is a block diagram illustrating the configuration of the control station 101, whereas FIG. 2B is a block diagram illustrating the configuration of nodes 102 to 107. Note that while FIG. 2B illustrates the configuration of the node 102 as a representative example, the configuration of nodes 103 to 107 is identical.

In FIGS. 2A and 2B, 201 and 207 are wireless communication units that function as carrier detection units for detecting electric waves on a transmission path and also have functions for transmitting/receiving data using electric waves and controlling antennas. In particular, the wireless communication unit 207 functions as a signal receiving means that receives a wireless signal from an external device. 202 and 208 are control units that perform processing according to the present embodiment. 203 and 209 are memories that store data and control programs. 204 and 210 are timers for measuring the time necessary for communication control, and are configured of plural independent timers. 205 is an external interface for communicating data, control information, and the like from the data processing apparatus 109 to the control station 101. 212 is a signal processing unit that performs processing on data received from the control station 101. 206 and 211 are antennas for inputting/outputting electric waves during transmission/reception performed by the wireless communication units 201 and 207.

Note that it is also possible to configure the abovementioned constituent elements through software that implements the same functions as those constituent elements, rather than through hardware devices.

In the present embodiment, the control station and nodes are respectively described as being configured of a single device, for the sake of simplicity; however, they may have configurations in which their resources are spread throughout plural devices. For example, the configuration may be implemented so that the storage and computational resources are spread throughout plural devices. Alternatively, the resources may be spread per process implemented virtually in the devices, with processing being carried out in parallel.

Figure 5A:
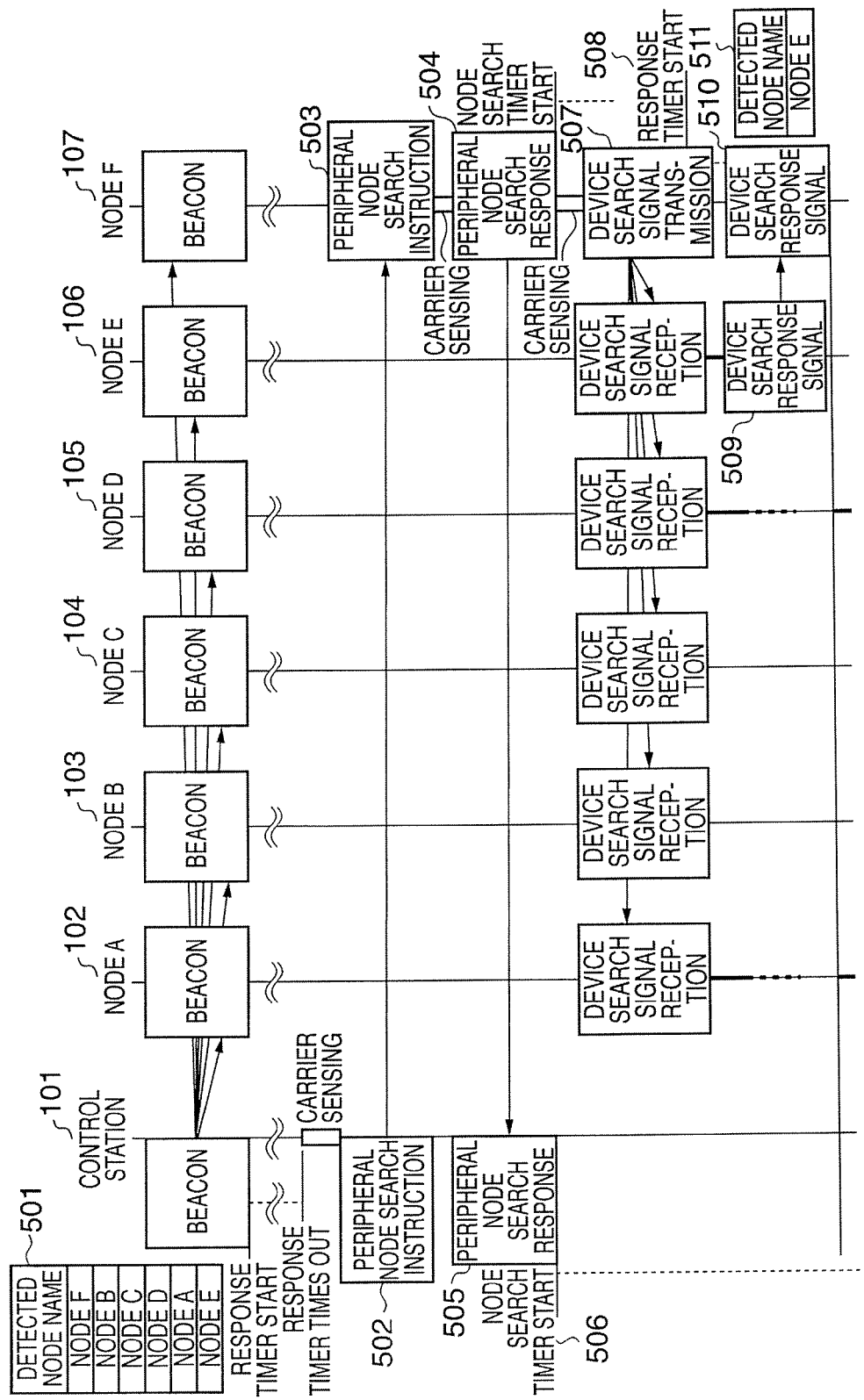
Figure 6A:
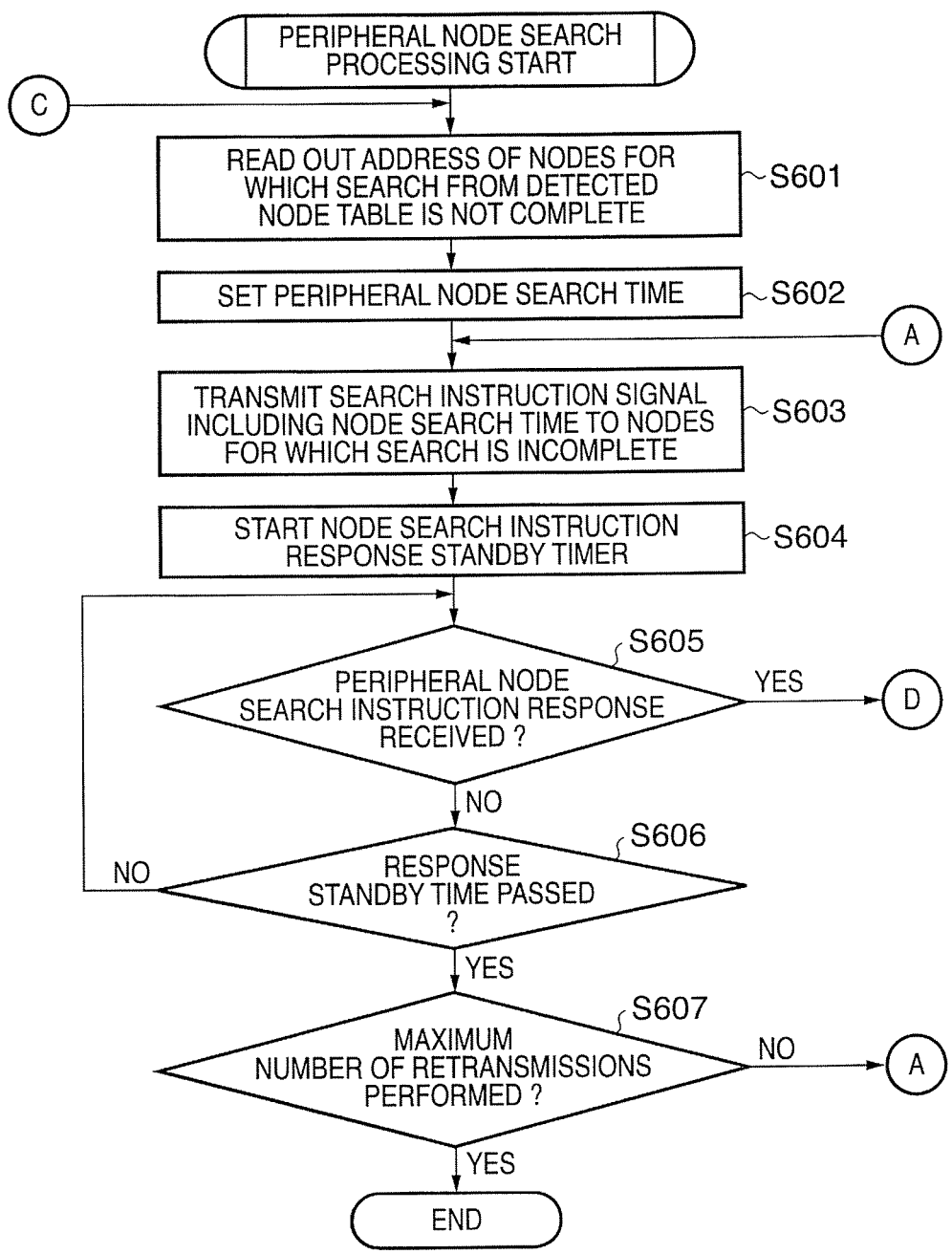
FIGS. 6A and 6B are flowcharts illustrating node search processing, the execution of which is controlled by the control unit of the control station, so that a node can search for peripheral nodes capable of wireless communication based on the control station.
Figure 6B:
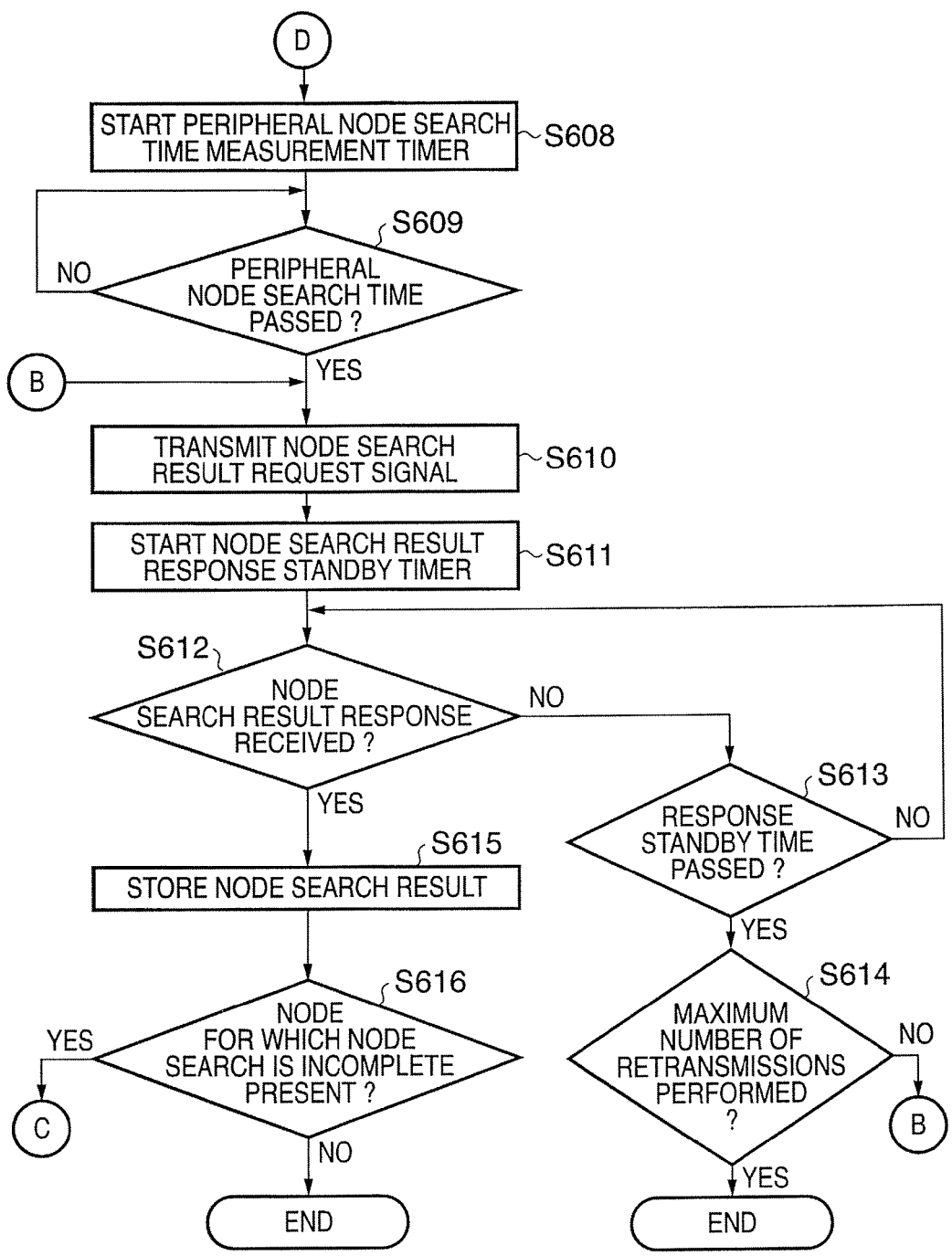

FIGS. 3A and 3B are sequence diagrams illustrating a sequence through which the control station 101 detects the nodes 102 to 107. FIG. 4 is a flowchart illustrating a procedure for node detection processing, the execution of which is controlled by the control unit 202 of the control station 101. FIGS. 5A and 5B are sequence diagrams illustrating a sequence through which a node searches for (detects) peripheral nodes capable of wireless communication in response to an instruction from the control station 101. FIGS. 6A and 6B are flowcharts illustrating a procedure for node search processing, the execution of which is controlled by the control unit 202, so that a node can search for peripheral nodes capable of wireless communication based on the control station 101. FIG. 7 is a diagram illustrating an example of an information table showing the results of the nodes 102 to 107 searching for peripheral nodes, the table being stored in the memory 203 of the control station 101. FIGS. 3A to 7 shall be described in reference to the following explanations.

Figure 8:
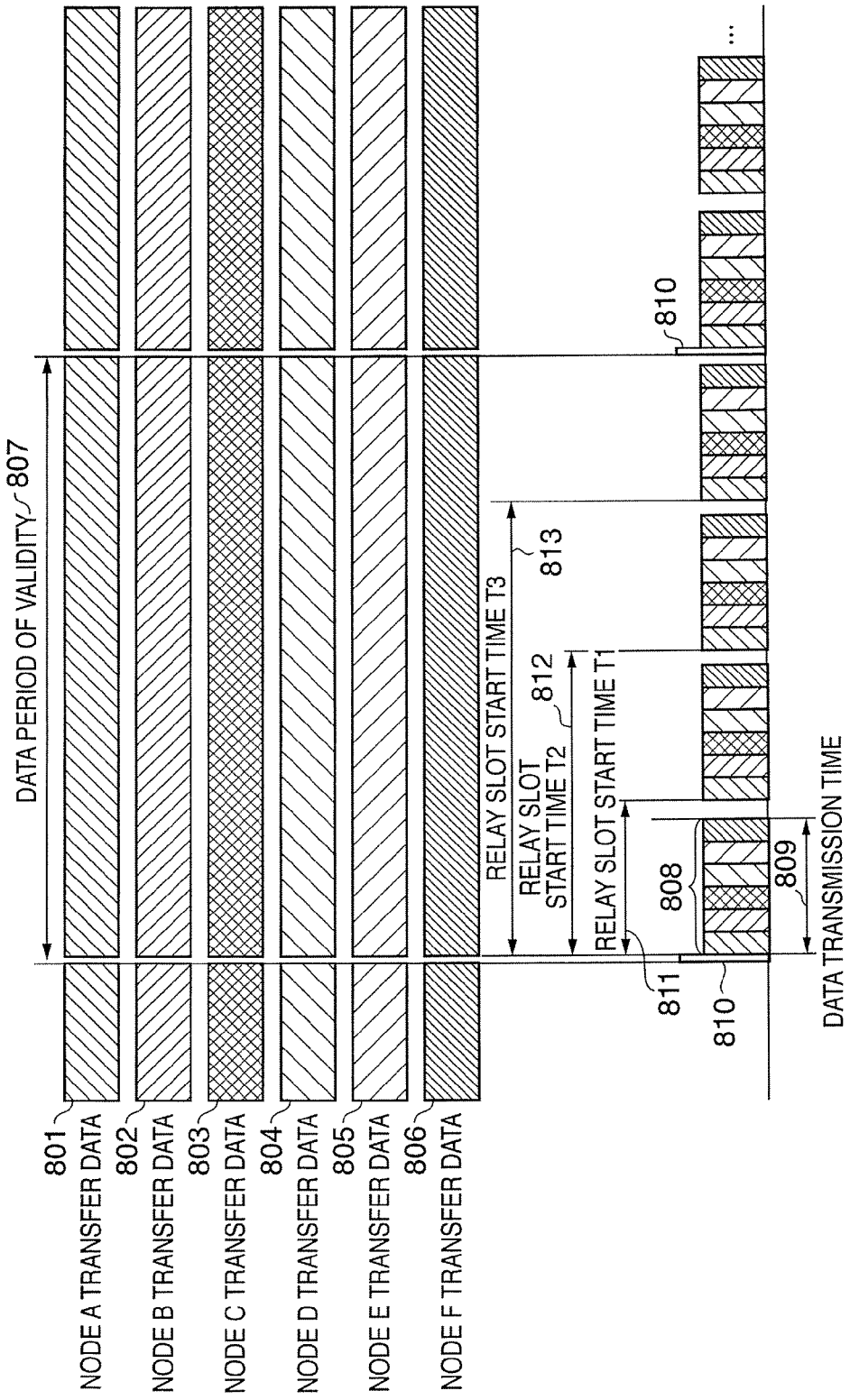
FIG. 8 is a diagram schematically illustrating transmitted data.

FIG. 8 is a diagram schematically illustrating transmitted data according to the present embodiment. 801 to 806 are data transmitted to respective nodes, the data being generated by the data processing apparatus 109, and are, for example, stream data of an acoustic signal. 807 is the period of validity of the data. 808 is multiplexed data in which the transmission data 801 to 806 of the respective nodes is compressed on the time axis for the purpose of wireless transmission. 809 is the amount of time necessary for the data indicated by 808 to be wirelessly transmitted. 810 is a beacon signal outputted from the control station 101 to all nodes. 811 to 813 indicate the time until a relay node relays received data.

Figure 9:
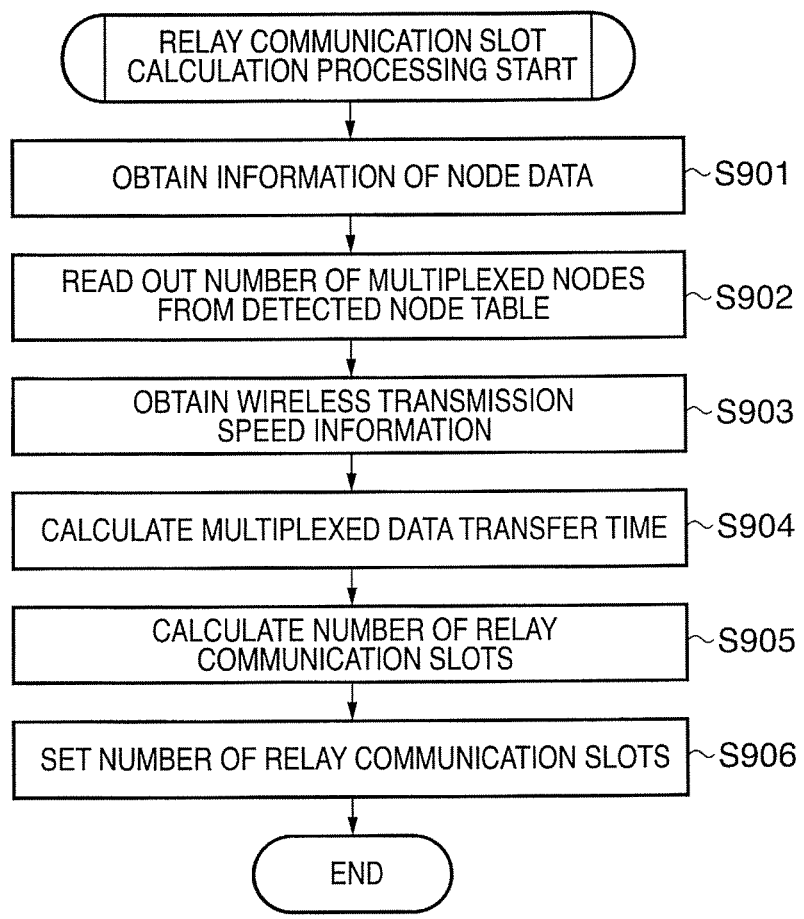
FIG. 9 is a flowchart illustrating a procedure of processing for determining the number of relay communication slots, the execution of which is controlled by the control unit of the control station.
Figure 10:
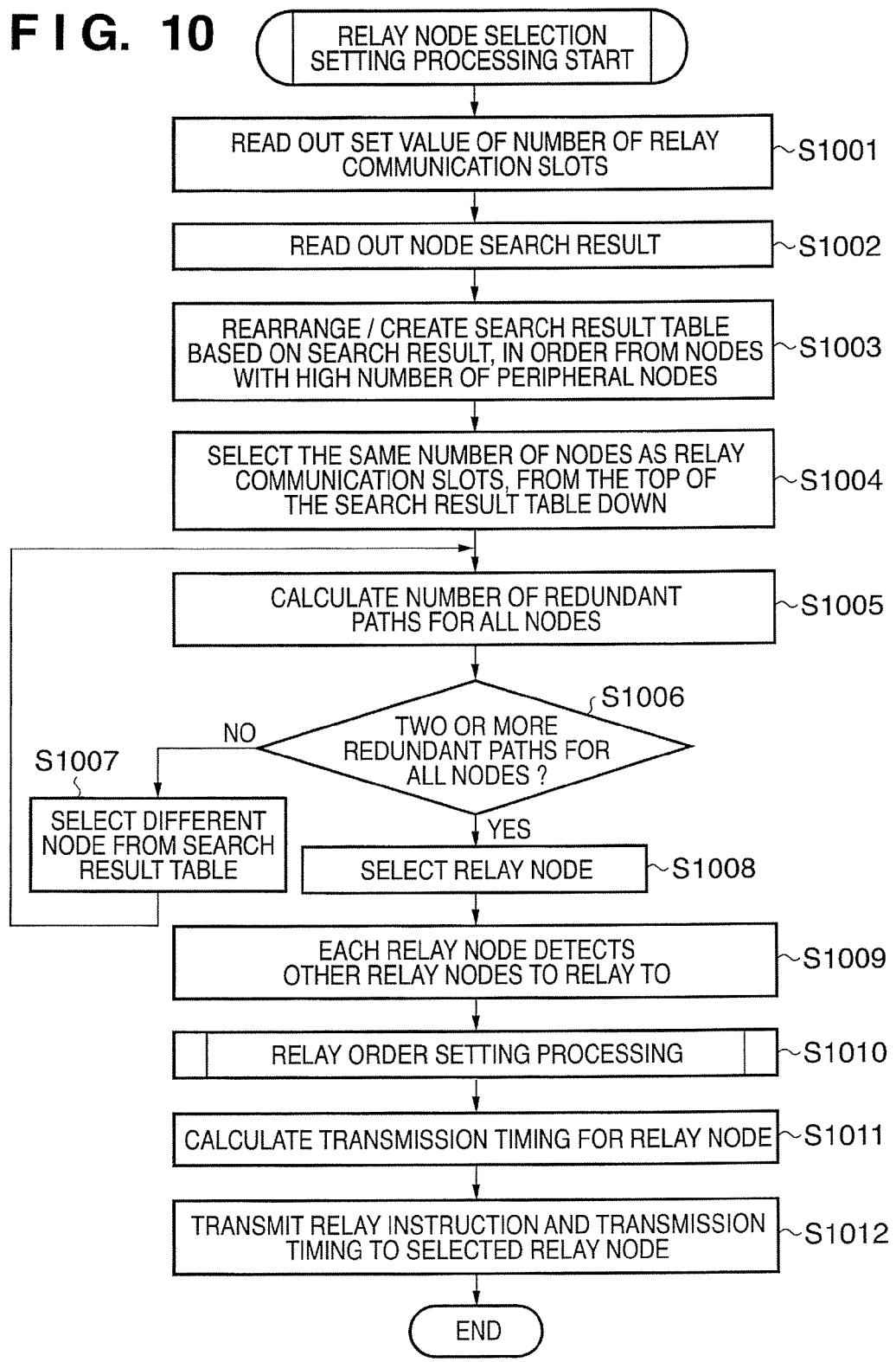
FIG. 10 is a flowchart illustrating a procedure for relay node selection setting processing performed so that the selection of a relay node from among plural nodes can be set, the procedure being controlled by the control unit of the control station.
Figure 12B:
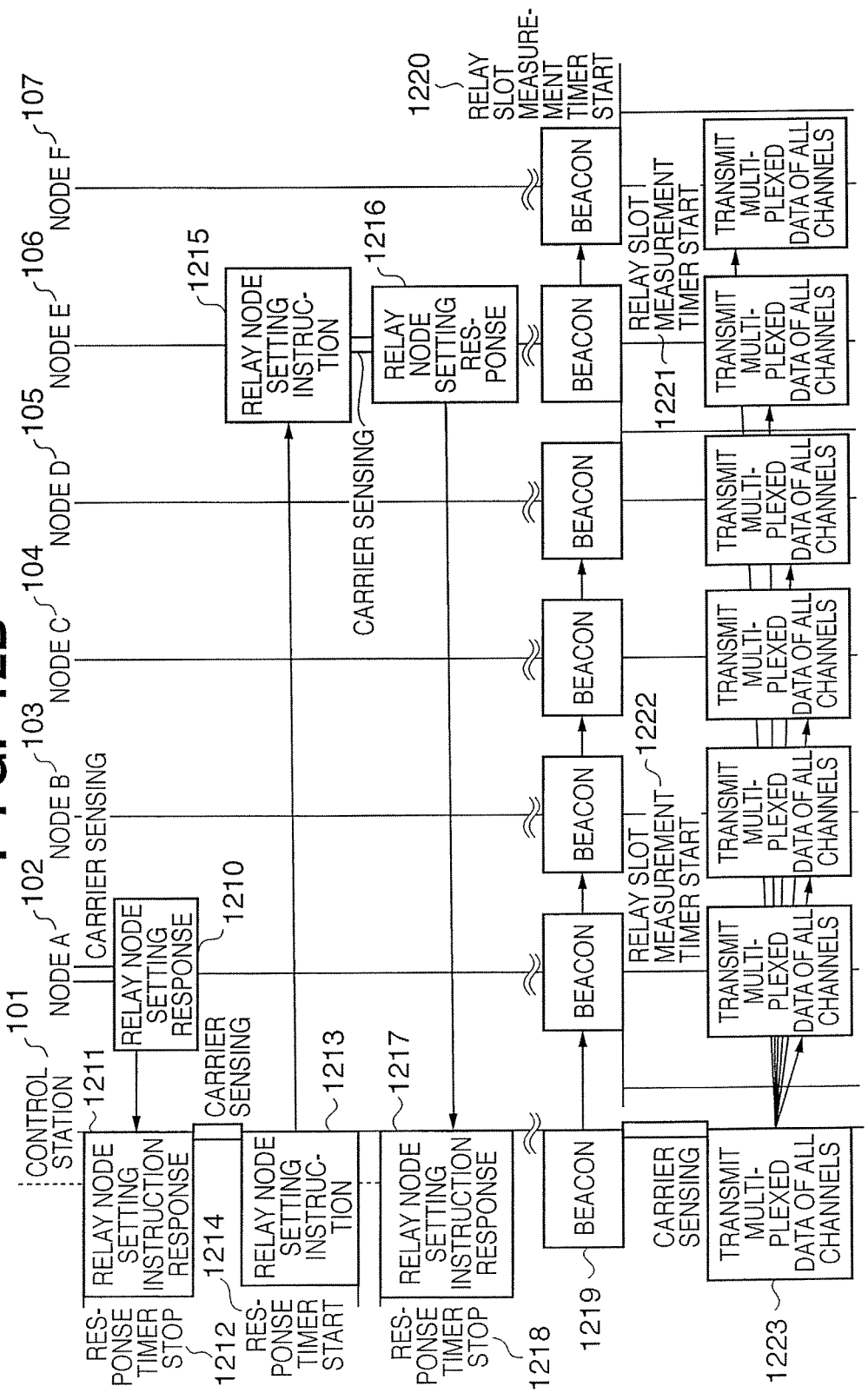

FIG. 9 is a flowchart illustrating a procedure of processing for determining the number of relay communication slots, the execution of which is controlled by the control unit 202 of the control station 101. FIG. 10 is a flowchart illustrating a procedure for relay node selection setting processing (redundant path setting processing) performed so that the selection of a relay node from among plural nodes can be set, the procedure being controlled by the control unit 202 of the control station 101. FIG. 11 is a diagram illustrating an example of the result of reconfiguring the information table showing the results of the nodes 102 to 107 searching for peripheral nodes, the table being stored in the memory 203 for the control unit 202 of the control station 101 to carry out relay node selection processing. FIGS. 12A-12C are sequence diagrams illustrating data transmission and relay transmission operations performed by the control station 101 and nodes 102 to 107. FIGS. 9 to 12 shall also be described in reference to the following explanations.

Figure 13:
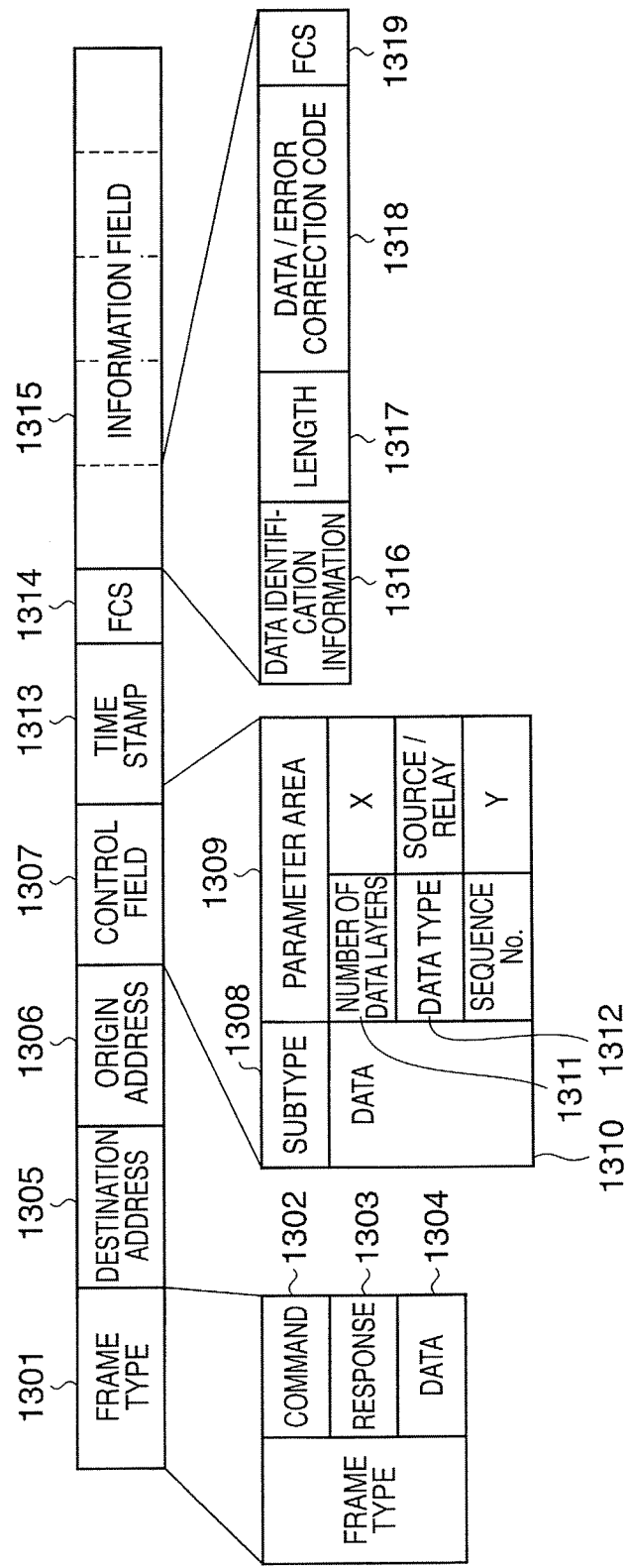
FIG. 13 is a diagram specifying the information used when transmitting data frames, in the frame format transmitted by the control station and nodes.

FIG. 13 is a diagram indicating the information used when transmitting data frames, in the frame format transmitted by the control station 101 and nodes 102 to 107. 1301 is a frame type field, identifying the frame type; 1302 is a command frame; 1303 is a response frame; and 1304 shows that code indicating the data frames is written. 1305 is a destination address field into which unique identification information of a communication partner (identification information) or broadcast information receivable by all nodes is written. 1306 is an origin address field into which unique identification information of the origin in written.

1307 is a control field into which information necessary for frame transmission is written, and is configured of a subtype area 1308 and a parameter area 1309. 1310 shows that code indicating data frames is written in the subtype area 1308; 1311 is an area in which the number of multiplexed layers in the data transmitted as data frames is written. 1312 is an area in which identification information of the data is written, where code indicating "source" is written when the data frame is transmitted from the control station, and code indicating "relay" is written when the data frame is transmitted from a relay node. 1313 is a field in which time stamp information is written. 1314 is a frame check sequence for detecting errors in the frame header, from the frame type field to the time stamp field.

1315 is an information field storing data of each of the nodes, where all the data of each of the nodes is stored. 1316 is a data identification information area for identifying one piece of node data stored in the information field 1315; information such as a data sequence number or an address indicating node A 102, through which the node can be identified, is written in this field. 1317 is a length information area indicating the length of the data that follows. 1318 is a data/error error correction code area storing data addressed to the node. The data to be transferred is not the only item stored in the data/error correction code area 1318; for example, data encoded through error correction code such as Reed-Solomon coding or convolutional encoding can also be stored therein. Through this, it is possible to implement a configuration in which error correction can be carried out using the information stored in the data/error correction code area 1318. 1319 is an area in which a frame check sequence for detecting errors in the data from the data identification information area 1316 to the data area 1318 is stored.

Figure 14:
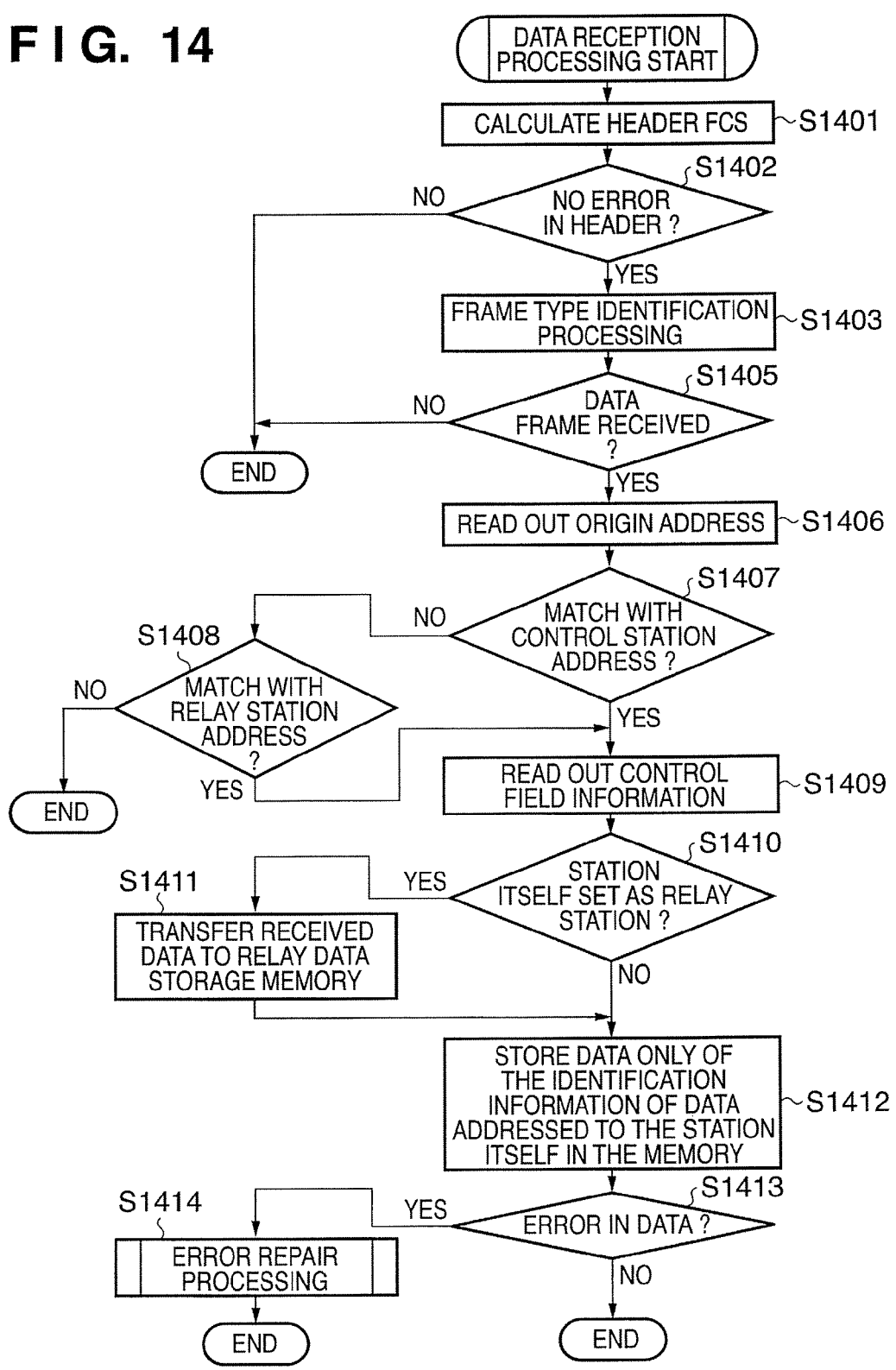
FIG. 14 is a flowchart illustrating a procedure for data reception processing, the execution of which is controlled by the control unit of each node.
Figure 15:
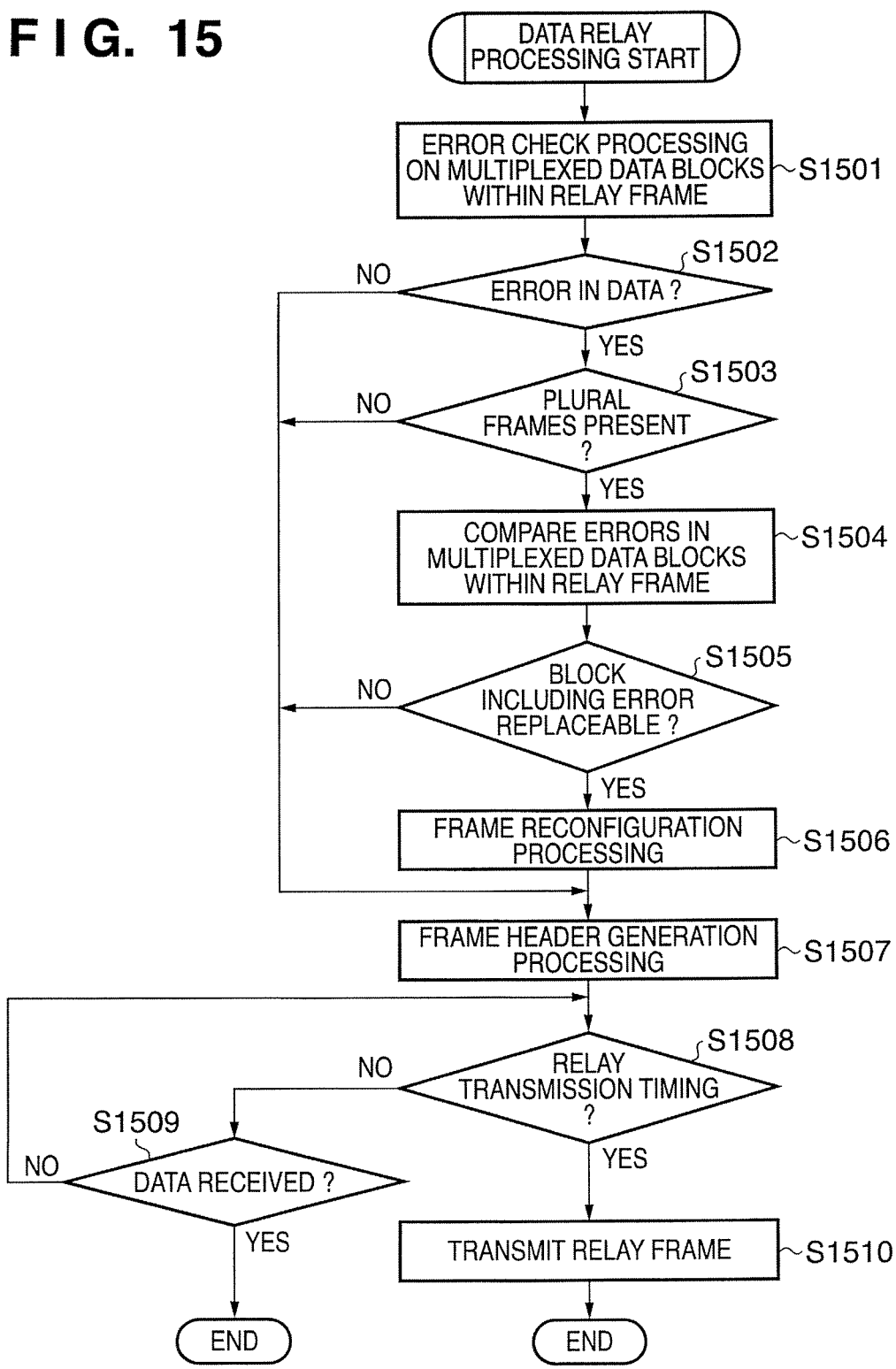
FIG. 15 is a flowchart illustrating a procedure for data relay processing, the execution of which is controlled by the control unit of a node selected as a relay node.
Figure 16A:
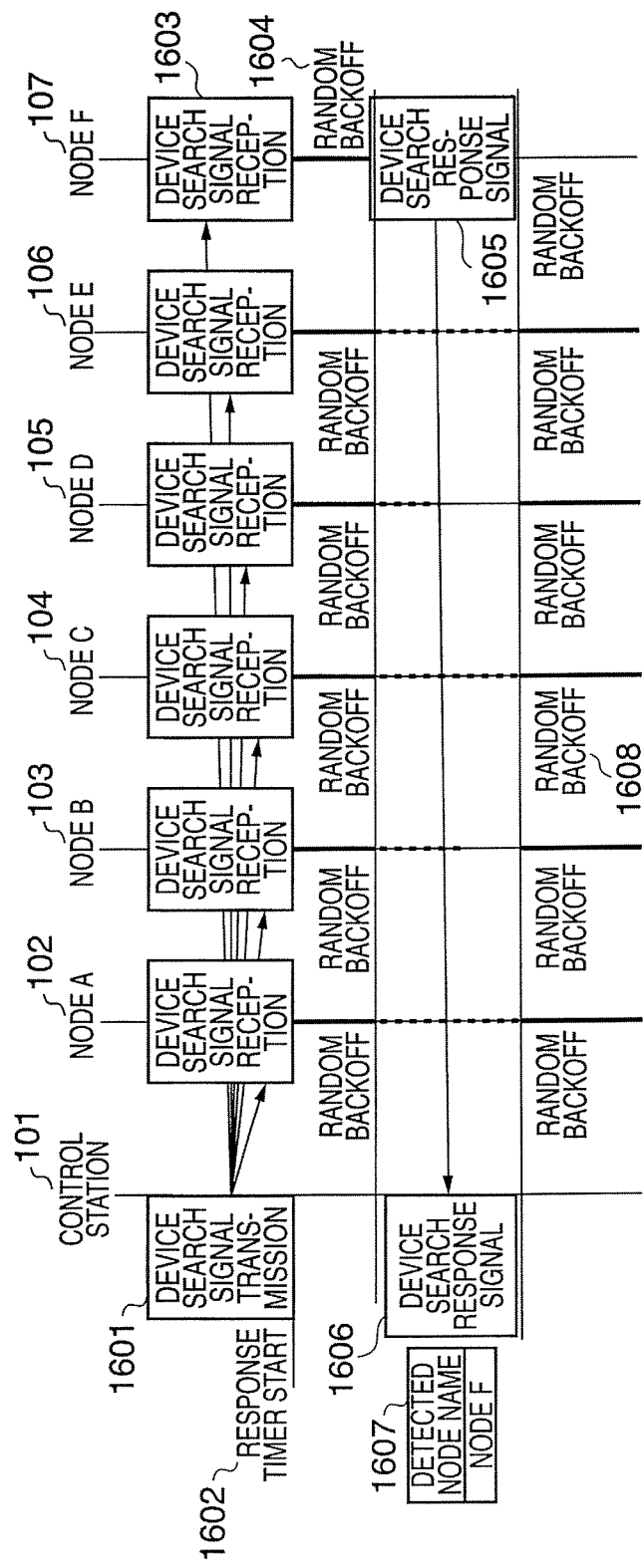
Figure 16C:
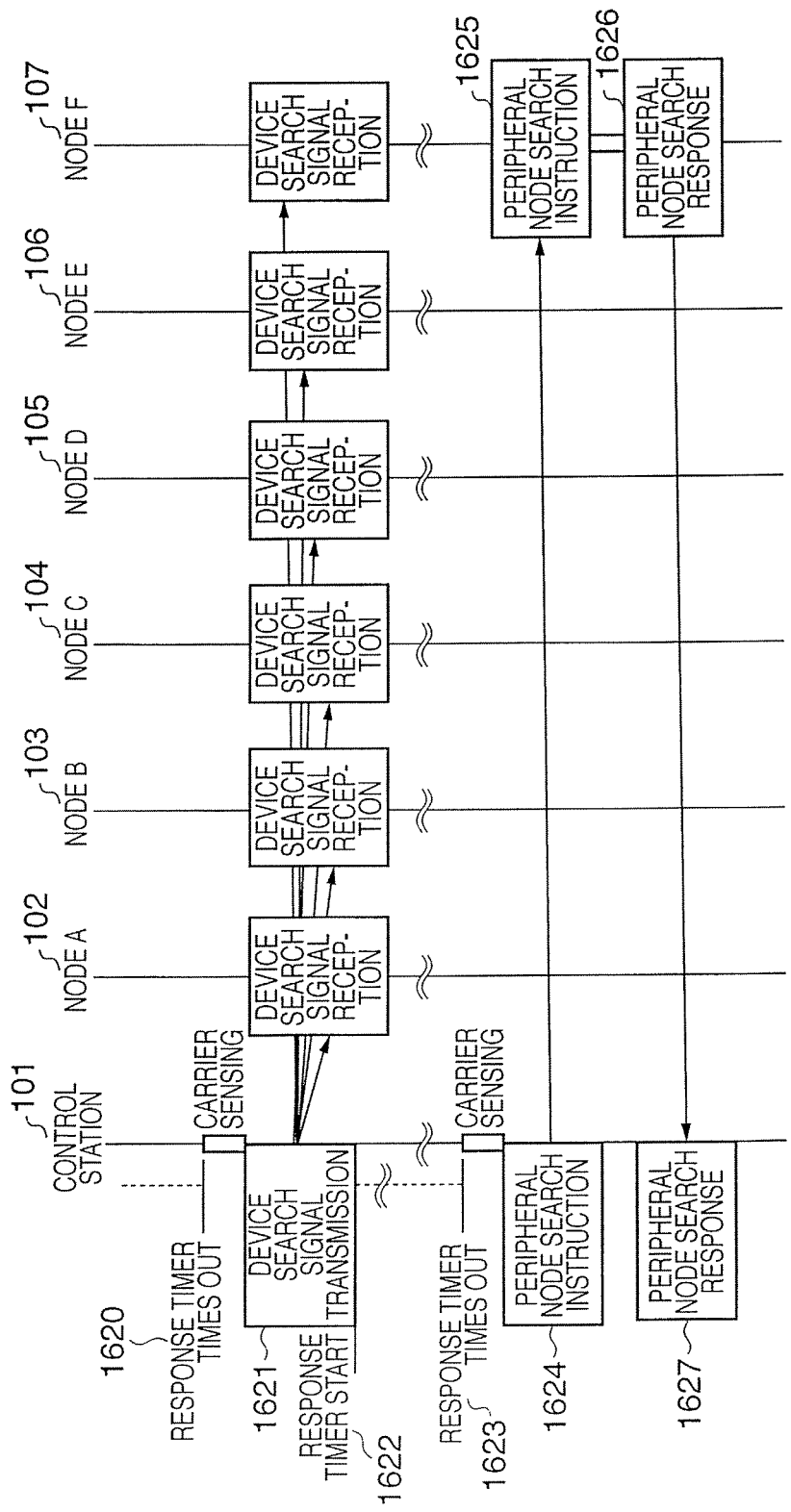

FIG. 14 is a flowchart illustrating a procedure for data reception processing, the execution of which is controlled by the control unit 208 of each node (for example, node 102). FIG. 15 is a flowchart illustrating a procedure for data relay processing, the execution of which is controlled by the control unit 208 of the node selected as the relay node. FIGS. 16A-16C are sequence diagrams illustrating another method through which the control station 101 detects nodes. FIGS. 14 to 16 shall also be described in reference to the following explanations.

(Outline of Processing)

In the exemplary configuration shown in FIG. 1, in order to transmit data from the data processing apparatus 109, the control station 101 and nodes 102 to 107 carry out the following processing, thereby transmitting data to the nodes 102 to 107.

(1) Node Detection Processing

First, the control station 101 performs processing for detecting the nodes to which the data is to be transferred, by detecting the nodes that are capable of wireless communication with the control station 101 itself.

(2) Peripheral Node Search Processing

Next, the nodes 102 to 107 performs processing for searching for (detecting) other nodes capable of wireless communication with the node that is performing the search, and notify the control station 101 of the identification information of nodes that are found.

(3) Relay Communication Slot Computation Processing

Next, the control station 101 calculates the number of relay communication slots that can be allocated in a beacon period. Here, the transmission time of the data to be transmitted in the beacon period is calculated based on the amount of data to be transmitted in the beacon period and the bandwidth usable in communication between devices; then, the number of relay communication slots that can be allocated in the beacon period is calculated based on the transmission time and the beacon period. Note that the relay communication slot is a period for performing relay transmission of the data, and is equivalent to the relay communication timing.

(4) Relay Node Selection Setting Processing

Next, the control station 101 selects a relay node (relay apparatus) to relay the transmission of the data from plural nodes based on the received identification information, and sets the relay communication timing in accordance with the selected relay apparatus. The selection of the relay apparatus and setting of the communication timing is carried out based on the number of relay communication slots calculated in the relay communication slot calculation processing. Then, the selected relay apparatus is notified of an instruction to relay the data and the communication timing. The setting mentioned here is carried out so that a node that receives data from the control station 101 via two or more transmission paths is present.

(5) Data Transmission Processing

Next, the control station 101 transmits the data that is to be transmitted. The node selected as the relay apparatus performs processing for relaying the received data. In other words, the node notified by the control station 101 of the instruction to relay the data and the communication timing controls transmission of the received data in accordance with the notified communication timing.

Each processing shall be described in detail hereinafter.

(Node Detection Processing)

Next, node detection processing (connection processing) shall be described with reference to FIGS. 1 to 4. Hereinafter, the descriptions shall follow the sequence illustrated in FIGS. 3A and 3B and the procedure illustrated in the flowchart in FIG. 4.

First, when the power of the control station 101 is turned on, the control unit 202 resets the wireless communication unit 201, sets information necessary for beacon transmission, such as the beacon period, and then commences transmission of a beacon signal 301. Having finished instructing the beacon transmission, the control unit 202 sets a connection standby timer value in the timer 204, proceeds to the connection processing operations, and starts the connection standby timer, in Step S401 of FIG. 4. Then, the procedure moves to Step S402, a step of confirming a connection request from a node, where the connection request is confirmed. Here, in the case where a connection request is not detected (NO in Step S402), the procedure moves to a connection standby time timeout monitoring step S407, where a connection standby time timeout is confirmed. Then, in the case where the connection standby time has not passed (NO in Step S407), the procedure once again moves to the connection request confirmation step S402, where a connection request is confirmed.

This processing is repeated until a connection request is detected in Step S402 (YES in Step S402) or until the standby time has passed (YES in Step S407). In other words, the control unit stands by for the reception of a connection request from a node from when the connection standby timer is started in Step S401 until when the connection standby timer times out.

Assuming that a connection standby time timeout 315 is detected in the connection standby time timeout monitoring step S407 (YES in Step S407), the control unit 202 ends the connection processing, and confirms whether plural nodes have already been detected. Here, in the case where plural nodes have not been detected, and there is no data transmission instruction from the data processing apparatus 109, the control unit 202 returns once again to Step S401 and performs the connection processing. In the case where the control unit 202 of the control station 101 has confirmed that there are already plural detected nodes, the control unit 202 does not perform the connection processing, but rather moves to the node search processing (315 to 319) shown in FIG. 3B.

On the other hand, after each of the nodes 102 to 107 is powered on, the wireless communication units 207 thereof are reset under the control of the control unit 208, after which the procedure for detecting the reception of the beacon signal 301 transmitted from the control station 101 is repeated.

In the example given in FIGS. 3A and 3B, when the beacon signal 301 is detected by the node F 107, the wireless communication unit 207 of the node F 107 outputs beacon detection information to the control unit 208. Having received the beacon detection information, the control unit 208 outputs an instruction for the wireless communication unit 207 to transmit a connection request signal to the control station 101. Having received this instruction, the wireless communication unit 207 senses carriers on the wireless space transmission path for a random backoff time 302 in which a random value is generated. In the case where carriers of other nodes have not been detected during the random backoff time, the wireless communication unit 207 transmits a connection request 303 to the control station 101, and stands by for reception of a connection acknowledgment signal 307, as shown in FIG. 3A.

When the connection request reception 304 is detected by the control station 101 (YES in Step S402), the connection processing performed by the control unit 202 of the control station 101 moves to Step S403, and the connection standby timer is reset. Then, the procedure moves to Step S404, and processing for transmitting the connection acknowledgment signal is performed. In the connection acknowledgment signal transmission processing (Step S404), a connection acknowledgment signal 306, in which the unique identification information of the node F included in the connection request 304 is set in the destination address, is generated and transmitted to the node F 107 via the wireless communication unit 201. Then, the procedure moves to a detected node registration processing step S405. In Step S405, the unique identification information of the node F 107 acquired earlier is registered in a detected node table 308 and stored in the memory 203. Then, in Step S406, the connection request detection operations are carried out once again after starting the connection standby timer.

On the other hand, the node F 107 that has received the connection acknowledgment signal 307 from the control station 101 goes into a connected state, and stands by for reception of a peripheral node search instruction signal or data from the control station 101, as shown in FIG. 3A.

In the example shown in FIG. 3A, a connection request 310 is next transmitted from the node B 103 after a random backoff time 309. In response to this, upon receiving the connection request 311, the control station 101 transmits a connection acknowledgment signal 312 using the same connection processing as used with the node F 107, and registers the information of the node B 103 in a detected node table 314. On the other hand, in the same manner as the node F 107, the node B 103 that has received the connection acknowledgment signal 313 from the control station 101 goes into a connected state, and stands by for reception of a peripheral node search instruction signal or data from the control station 101. In this manner, the connection processing is repeated by the control unit 202 of the control station 101; the connection processing ends and the procedure moves to the node search processing upon confirmation that plural detected nodes are present after the connection standby time has passed.

In the present embodiment, a configuration that controls the execution of the node search processing based on the connection standby time timeout occurring in the control station 101 and the number of detected nodes is described as an example. However, in the case where the control station 101 is notified of information of the number of communicating nodes in advance by the data processing apparatus 109 via the external interface 205, it is possible to control the connection processing based on the notified information. For example, a configuration is possible where, in the case where the control station is notified by the data processing apparatus 109 that the number of communicating nodes is six but has only detected three nodes, the connection processing is continued even if two detected nodes are confirmed after the connection standby time has timed out. Furthermore, a configuration is possible where a maximum number of timeouts for the connection standby time is set in the control unit 202 of the control station 101 during these operations, and in the case where a predetermined number of nodes has not been detected even after this number has been exceeded, error information is transmitted to the data processing apparatus 109 and the processing ends.

Additionally, the previous descriptions provide an example in which the beacon signal 301 is transmitted from the control station 101, and the nodes 102 to 107 that have received the beacon signal 301 automatically proceed to connection operations. However, the node detection operation is not limited hereto; as shown in FIGS. 16A-16C, node searching may be performed actively by the control station 101. By performing such processing when appropriate, the possibility of reducing the amount of search time increases in the case where the number of nodes to be connected is known in advance and the number of detected nodes fulfills that value. Hereinafter, operations for performing active node detection shall be described with reference to FIGS. 16A-16C.

In the same manner as the previous descriptions, when the control unit 202 of the control station 101 proceeds to the node detection operations, the control station 101 generates a device search signal 1601 using a broadcast receivable by all nodes, and transmits the device search signal 1601 via the wireless communication unit 201. Then, a predetermined node detection time is set in the timer 204, and measurement of a device search response time commences (1602). The nodes 102 to 107 that receive the device search signal 1603 perform carrier sensing for a random backoff time 1604 in order to avoid access conflicts, and the node F 107, for which the random backoff time has finished early, transmits a device search response signal 1605. Having received the device search response signal 1606, the control station 101 registers the unique identification information of the node F 107 included in the device search response signal in a detected node table 1607, and stores this in the memory 203.

Once the node F 107 has finished transmitting the device search response 1605 and no electric waves are detected on the wireless transmission path, the other nodes that received the device search signal 1601 once again perform the random backoff procedure 1608, and, as described earlier, attempt transmission. The node 104, for which the random backoff time has finished early, transmits a device search response signal 1609; having received this signal 1610, the control station 101 updates the detected node table 1611 in the same manner as described earlier.

However, the node E 106, which received the device search signal 1601 but could not obtain a chance to perform transmission through the random backoff procedure, goes over the number of access retries (1612), and thus abandons the response signal transmission. Accordingly, the control station 101 continues to receive the device search response signals until the time set for the node detection time has passed, and once this time times out at 1613, the control station 101 commences carrier sensing (1614), and once again transmits the device search signal (1616). The repetitions of this procedure are the same as the processing performed in the aforementioned beacon detection, and each of the devices performs the similar processing (1617 to 1627).

As has been described thus far, the control station 101 may be caused to actively search for devices. In such a case, the chances for a node to receive this search signal are increased by setting the node detection time to a short interval; as a result, there is the possibility that the search time can be reduced. Note that although detailed descriptions regarding the device search signal shall be omitted here, it is possible to communicate the period of validity of the signal by including the set value of the node detection time in the signal; this makes it possible to avoid interference between newly-transmitted device search signals and the response signals from the nodes.

Also note that the method for detecting nodes capable of wireless communication with the control station 101 is described here as being based on communication between the control station 101 and the nodes as an example; however, this method is not limited thereto. For example, list information of the identification information of nodes to be transmitted to may be obtained, or detection may be carried out based on instructions inputted by a user. Alternatively, a global positioning system (GPS) may be provided in the control station 101 and each of the nodes, and the nodes capable of wireless communication with the control station 101 may be detected thereby.

(Peripheral Node Search Processing)

Next, node search processing for searching for peripheral nodes with which each node is capable of wireless communications (peripheral node search processing) shall be described with reference to FIGS. 1, 2A, 2B, and 5 to 7.

When the control unit 202 of the control station 101 detects plural nodes and performs the processing from connection to node searching, the control unit 202 proceeds to Step S601, and reads out a detected node table 501 stored in the memory 203. Then, the control unit 202 reads out the unique identification information of a node for which a peripheral node search has not been performed from among the node information registered in the table 501, sets the peripheral node search time in the timer 204 in Step S602, and proceeds to Step S603.

In Step S603, a peripheral node search instruction signal (instruction information) 502, which includes peripheral node search time information and which uses the unique identification information of the read-out node (for example, 107) as the destination, is transmitted (controlled to be transmitted) via the wireless communication unit 201. When transmission of the peripheral node search instruction signal 502 has finished, a peripheral node search instruction response standby time is set in the timer 204 and the timer 204 is started (S604). Then, in Steps S605 and S606, the control unit 202 stands by for reception 505 of a response to the peripheral node search instruction. Here, in the case where the response signal is not obtained even after the peripheral node search instruction response standby time passes (NO in Step S605, YES in Step S606), the procedure moves to Step S607. In Step S607, transmission of the search instruction signal 502 to the same node F 107 is repeated up until a maximum retransmission number set in advance.

Next, when the peripheral node search instruction response 505 is received (YES in Step S605), the procedure moves to Step S608. In Step S608, a peripheral node search time measurement timer set in the timer 204 is started (506); the procedure moves to Step S609, where the control unit 202 stands by until this time has passed.

On the other hand, the node F 107 that received the peripheral node search instruction signal 503 sets the peripheral node search time included in this signal in the timer 210, and transmits a peripheral node search instruction response 504 addressed to the control station 101 via the wireless communication unit 207. When transmission of the peripheral node search instruction response 504 has finished, the peripheral node search time measurement timer set in the timer 210 is started. Then, a device search signal 507 in which a broadcast address is set is generated by the control unit 208 and transmitted via the wireless communication unit 207, and measurement of the device search response standby time by the timer 210 is started (508).

The peripheral nodes 106, 105, and 102 that received this signal carry out carrier sensing for the random backoff time in the same manner as when connecting to the control station 101, after which the node E 106, which has not detected a carrier, transmits a device search response signal 509. The node F 107 that received the device search response signal 510 registers the unique identification information included in this signal in a peripheral node search result table 511 and stores this in the memory 209, and stands by for a response from other nodes. The nodes D 105 and A 102, which received the device search signal 507 previously and which experience conflict with the node E 106 in terms of transmission timing, perform the random backoff procedure once again after the node E 106 finishes transmission, and attempt transmission of a response signal. Then, the node D 105, for which the backoff time passes first in this procedure, transmits a device search response signal 512 that includes its own unique identification information. The node F 107 that received the device search response signal 513 updates the peripheral node search result table 514 with the unique identification information included in this signal, in same manner as when the node E 106 was detected, and stores this in the memory 209. The series of operations for transmitting the device search signal once as performed by the node F 107 continues until the device search response standby time passes, and once this standby time passes (516), the device search signal 517 is transmitted once again. Here, when the set time of the peripheral node search time measurement timer started after transmission of the peripheral node search response 504 passes (518), the node F 107 finishes the series of peripheral device search operations. The node F 107 starts measurement of the response time by the timer 210 when it sends the device search signal 517, but in the example shown here, because the node search response timer times out (518) before the response timer times out (519), if the node F 107 detects the node search timeout (518), it resets the response timer.

In the same manner, having detected the passing (520) of the set time of the peripheral node search time measurement timer, the control unit 202 of the control station 101 proceeds to Step S610. Then, the control unit 202 generates a node search result request signal 521 with the unique identification information of the node F 107 used as the destination, and transmits this signal via the wireless communication unit 201. After this, the control unit 202 of the control station 101 starts a response standby timer for this signal (Step S611), and stands by until a response is received (Steps S612 and S613). In the case where a response is not obtained even after this node search result request response standby time has passed (NO in Step S612, YES in Step S613), the procedure moves to S614, where transmission of the node search result request signal 521 is repeated up until a maximum retransmission number.

Having received this node search result request signal 522, the node F 107 generates a node search result response signal 523 that includes information of the peripheral node search table, and transmits this signal to the control station 101 via the wireless communication unit 207. Having received the node search result response signal 524, the control unit 202 of the control station 101 associates the information of the peripheral node search table 525 included in this signal with the unique identification information of the node F 107 and stores the resultant (Step S615), and adds a search completion flag to the detected node table 501. Next, the procedure moves to Step S616. In Step S616, it is confirmed whether or not there is a node for which the peripheral node search has not been completed, and in the case where there is a node for which the search has not been completed, the procedure moves to Step S601 and the series of operations is repeated. Then, the peripheral node search result table for all nodes detected by the control station 101, such as is shown in FIG. 7, is created and stored in the memory 203. In the case where there are no nodes for which the search is incomplete, the peripheral node search processing ends, and the relay communication slot setting processing is carried out.

(Relay Communication Slot Computation Processing)

Next, relay communication slot computation processing (redundant path computation processing) shall be described with reference to FIGS. 2A, 2B, 8, and 9.

When the creation of the peripheral node search result table for all nodes detected by the control station 101, such as is shown in FIG. 7, is completed, the processing of Step S901 is carried out. In Step S901, the control unit 202 obtains, from the data processing apparatus 109, information including the number of pieces of node data to be transferred, indicated by 801 to 806, and the transmission speed (bitrate) of each of these pieces of data.

Next, in Step S902, the number of pieces of data to be multiplexed for data transmission is read out from the information obtained in Step S901 and the detected node table.

Next, in Step S903, wireless transmission speed information, indicating the wireless transmission speed (bitrate) at which the wireless communication unit 201 is capable of performing wireless communication, is acquired from the wireless communication unit 201.

Next, in Step S904, the communication bandwidth necessary for data to be transmitted to all nodes is calculated from the transmission speed (bitrate) of one channel of the data to be transmitted and the number of multiplexed layers of the transmission channel. Then, the time necessary for transmission in the case where data of the calculated communication bandwidth is transmitted at the wireless transmission speed indicated in the wireless transmission speed information obtained in Step S903 is calculated. It should be noted that FIG. 8 shows, for the sake of simplicity, an example where the data transmitted differs per node; however, the configuration according to the present embodiment can also be applied in the case where the same data is transmitted to plural nodes. Also, in the case where the same data is transmitted to plural nodes, there is no need to overlap and multiplex the same data. For example, in FIG. 8, in the case where data 802 and 803 are the same as data 801, there is no need to overlap and multiplex the data 801 to 803; only data 804 to 806 need be multiplexed with the data 801. In this manner, by multiplexing only the differing data, the communication bandwidth can be used effectively, and data transmission can be carried out efficiently.

Next, the procedure moves to Step S905, where the time allocable to the relay communication slot is calculated from a data period of validity 807 of the data 801 to 806 transmitted from the data processing apparatus and the time necessary to wirelessly transmit all the data calculated in Step S904. In other words, the number of relay communication slots that can be allocated within the data period of validity 807 is calculated by dividing the data period of validity 807 by the data transmission time 809 (=data period of validity 807/data transmission time 809). Note that the data period of validity 807 is equivalent to the period of the beacon signal 810, as shown in FIG. 8. Then, the result of this calculation is stored in the memory 203 as the number of relay communication slots (S906), and the relay communication slot calculation processing ends.

In the present embodiment, exemplary descriptions are given regarding the processing in the case where the number of pieces of node data specified by the data processing apparatus 109 is the same as the number of detected nodes. However, situations can be considered where the number of detected nodes is smaller or greater than the number of pieces of node data. As processing in the case where there is less node data, the communication paths of nodes aside from those specified as destination nodes by the data processing apparatus 109 are disconnected. However, it is also possible to set these nodes as relay nodes in the case where a relay path is valid as a result of the relay node selection setting processing described later. In the case where the node data is greater than the number of detected nodes, it is possible to first refer to the peripheral node search result table and then once again carry out connection operations if there is a node undetected by the control station. In the connection processing operations, when a node cannot be detected, it is also possible to multiplex and transmit the node data, and select a relay node so that plural communication paths can are secured for undetected nodes via the relay node.

(Relay Node Selection Setting Processing)

The relay node selection setting processing (redundant path setting processing) shall be described hereinafter with reference to FIGS. 2A, 2B, and 10 to 12.

Having finished the relay communication slot computation, the control unit 202 of the control station 101 commences the relay node selection processing illustrated in FIG. 10. First, in Step S1001, the relay communication slot number calculated earlier is read out, after which the procedure moves to Step S1002. In Step S1002, the peripheral node search result table (FIG. 7) is read out.

Then, in Step S1003, the details of the peripheral node search result table (FIG. 7) are referred to, and the table is reconfigured (FIG. 11), the nodes being arranged in order from nodes having higher numbers of peripheral nodes that are capable of wireless communication with down. In the example shown in FIG. 7, nodes B to D (103 to 105) and node F 107 have three peripheral nodes, whereas node A 102 and node E 106 have five peripheral nodes. For this reason, in Step S1003, the order of the nodes is rearranged so that the nodes A 102 and E 106, which have a greater number of peripheral nodes, are higher in the order, as shown in FIG. 11.

Next, in Step S1004, nodes are selected in order from the uppermost node in the reconfigured peripheral node search result table, the number of nodes selected being equal to the number of relay communication slots. Next, in Step S1005, the number of communication paths for all nodes is calculated based on the paths each node has with relay-capable nodes.

Then, in Step S1006, it is verified whether or not two or more communication paths have been set for all nodes as a result of this calculation. In the case where two or more communication paths are not set (NO in Step S1006), the procedure moves to Step S1007.

Then, in Step S1007, a node that does not meet the conditions is detected, and two or more nodes capable of wireless communication with this node are newly selected as relay nodes (relay apparatuses) from the peripheral node search result table (FIG. 11). Then, the procedure moves to Step S1005, where the calculation of the number of communication paths is once again carried out. This procedure is performed until a relay node that fulfills the conditions is found or until the pre-set maximum calculation number is reached. When this processing is completed (YES in S1006), the procedure moves to S1008. In the present embodiment, through this processing, nodes are preferentially selected as relay apparatuses, starting with nodes that have the highest number of other nodes capable of wireless communication. This also means that a node that receives data from the control station 101 via two or more transmission paths is present.

Next, in Step S1008, relay node selection is performed. At this time, in the case where the communication path calculation processing has ended due to the maximum calculation number being reached, the relay node having the lowest number of nodes that do not fulfill the conditions is selected.

When the relay node selection of Step S1008 is completed, the procedure moves to Step S1009, where the other selected nodes with which the node selected as the relay node is capable of wireless communication are detected. The procedure then moves to S1010. In Step S1010, a node is selected starting with the relay node that has the most other relay nodes, based on the results of S1009, and a relay communication slot allocation order is determined. Then, in Step S1011, when the relay communication slot allocation is completed, the communication timing allocated to each relay node is calculated.

Next, the procedure moves to Step S1012, where relay node setting instruction signals (1201, 1207, and 1213) including the calculated timing information and the unique identification information of the selected relay node are generated, and transmitted (communicated) to the relay nodes via the wireless communication unit 201. At the same time measurement of a response time commences (1202, 1208, and 1214). The relay nodes that received the relay node setting instruction signals 1203, 1209, and 1215 transmit relay node setting instruction responses 1204, 1210, and 1216 to the control station 101. In addition, each relay node sets the relay node communication slot information included in the relay node setting instruction signals 1203, 1209, and 1215 in the timer 210 of the relay nodes, and the setting processing is completed thereby. On receiving the relay node setting instruction responses (1205, 1211, and 1217), the control station stops the measurement of a response time (1206, 1212, and 1218) and starts to sense carriers.

(Data Transmission Processing)

Next, data transmission processing operations (data reception processing, data relay processing, data transmission control processing) shall be described with reference to FIGS. 2A, 2B, and 12 to 15.

Fist, upon receiving a data transmission request signal from the data processing apparatus 109 via the external interface 205, the control unit 202 of the control station 101 transmits a response signal to the data processing apparatus 109. After this, upon receiving the node data to be communicated from the data processing apparatus 109 via the external interface 205, the control unit 202 stores this data in the memory 203. Then, calculations including error correction coding and the frame check sequence 1314 are performed on each of the received pieces of data, after which data identification information 1316 addressed to each node and length information 1317 is generated per piece of data.

When this processing is completed for all of the node data, processing for generating a header for the data frame illustrated in FIG. 13 is carried out. In the header generation processing, code 1304 indicating the data is set in the frame type 1301, a broadcast address is set in the destination address 1305, and the unique identification information of the station itself is set in the origin address 1306. Next, code indicating data 1310 is set in the subtype area 1308 of the control field 1307, and the number of data channels transmitted from the data processing apparatus 109 is set in the data layer number 1311 of the parameter area 1309.

After this, code indicating the source is set in the data type 1312, information such as, for example, the generation time of the stream data is set in the time stamp field 1313, and the FCS 1314 is set after all frame check sequence computations of the header are performed. Once this series of processing is completed, the control unit 202 of the control station 101 transmits (1223) data to all the nodes via the wireless communication unit 201, as shown in FIG. 12B.

Next, the data reception processing performed by nodes shall be described with reference to FIG. 14. Upon receiving data via the wireless communication unit 207, the control unit 208 of the node stores the received data in the memory 209, and commences the data reception processing. Then, in Step S1401, a frame check sequence (FCS) computation for the data frame is carried out, and the header is checked for errors (Step S1402). Here, in the case where there are errors in the header, the received data frame is abandoned; in the case where there are no errors, the frame type 1301 is identified in Step S1403, and in Step S1405, it is confirmed that a data frame is being received. Note that although the header identification is performed during the data processing in the present embodiment, the identification of the frame type 1301 may be performed at the point in time when the frame is received and transferred to the memory 209, and processing appropriate for the frame type may be carried out.

When the identification of the data frame is completed, the origin address 1306 is read out in Step S1406, and in Steps S1407 and S1408, it is determined whether or not the origin address matches the address of the control station 101 or the address of the relay station. In the case where the addresses match, the received data is correct, whereas in the case where the addresses do not match, the data is incorrect.

First, in Step S1407, it is determined whether or not the origin address matches the address of the control station. In the case where the control station address and the origin address 1306 match (YES in Step S1407), the procedure moves to Step S1409. On the other hand, in the case where the control station address and the origin address 1306 do not match (NO in Step S1407), in Step S1408, it is determined whether or not the origin address 1306 and the relay station address match. In the case where the addresses match (YES in Step S1408), the procedure moves to Step S1409, whereas in the case where the addresses do not match (NO in Step S1408), the processing ends.

In Step S1409, the control information field is read out, and the procedure moves to Step S1410. In Step S1410, it is confirmed whether or not the terminal itself is set as the relay terminal. Then, in the case where the terminal itself is set as the relay terminal, the procedure moves to Step S1411, where the received data is transferred to a relay data storage area of the memory 209, after which the procedure moves to Step S1412; in the case where the terminal itself is not set as the relay terminal, the procedure moves to Step S1412.

In Step S1412, the data identification information 1316 is detected from the information field 1315 of the received frame, and the data block containing the identification information addressed to the terminal itself is loaded with reference to the length information 1317. After this, in Steps S1413 and S1414, error correction processing and error checking through a frame check sequence is performed in the data of the terminal itself 1318. Of this error correction, error correction performed through error correction code can be performed when the received data is transferred, by the control unit 208 performing header analysis at the same time as the data being transferred from the wireless communication unit 207 to the memory 209, at the time of frame reception.

The error repair processing indicated here (Step S1414) includes processing for determining the presence/absence of a correct instance of data reception prior to the present instance of data reception; in the case where the correct data has already been received, the error repair processing (Step S1414) is completed. Processing for performing error repair through maximum likelihood processing using plural pieces of received data performed in the case where there is an error in all pieces of the received data addressed to the station itself is also included herein. When the series of data reception processing finishes, the data reception processing is complete.

Next, processing performed by the node set as the relay node shall be described. First, the node set as the relay station receives the beacon signal 1219 transmitted from the control station 101 and then commences measurement of the slot time (1220 to 1222), based on the relay communication slot information included in the relay node setting instruction signal from the control station 101 mentioned above. Then, when the processing of receiving the data frames received from the control station 101 is completed, the control unit 206 commences the data relay processing, and checks for the presence/absence of errors in all the data blocks received in Step S1501. Here, if an error is detected in the data blocks (Step S1502), it is determined whether or not there are already plural received frames (Step S1503). In the case where plural data frames have been received (YES in Step S1503), the data blocks in which the error has been detected are compared to one another (Step S1504). Then, in the case where the data block that includes the error is replaceable with the data block included in the other data frame, the data block that includes the error is replaced with the correct data block, and the data frame is reconfigured (Steps S1505, S1506). In the case where the error in the data block cannot be repaired or the case where there is a data frame that does not include an error, the procedure moves to the next processing without reconfiguring the data frame. The data frame that includes the error is relayed particularly so as to carry out the maximum likelihood processing using plural data blocks in the error repair processing included in the data reception processing described earlier.

When this processing is completed, the procedure moves to Step S1507, where the header generation processing, such as setting the unique identification information of the station itself in the origin address field 1308 and resetting the code indicating the relay in the data type 1312, is performed. Then, the procedure moves to Step S1508, where the passage of the relay communication slot time commenced earlier is monitored; if the time has not passed a set time, the procedure moves to Step S1509, where the presence/absence of data reception from a node is confirmed. These operations are repeated until any of the aforementioned conditions are fulfilled; in the case where the relay communication slot time has been reached (1224, 1226, and 1228), the relay data is transmitted to the other nodes via the wireless communication unit 207 in Step S1510 (1225, 1227, and 1229), and the processing ends.

As described thus far, in the present embodiment, the control station 101 detects plural nodes (terminal stations, terminal apparatuses) 102 to 107, causes each of the detected nodes to search for peripheral terminal stations with which wireless communication is possible, and gathers the identification information of the detected peripheral terminals. Then, based on the collected identification information of the peripheral terminals, a relay terminal station is selected so that there is a node that receives data from the control station apparatus via two or more transmission paths, and the relay terminal station is assigned the role of the relay terminal (relay apparatus). This relay terminal performs the processing for relaying the data transmitted from the control station 101. In other words, upon receiving the data transmitted from the control station 101 and addressed to all of the terminal stations, the node selected as the relay terminal station relays the data to other terminal stations according to a relay communication timing. For this reason, this relay data is received by nodes via two or more communication paths, including from the relay terminal station.

Therefore, according to the configuration of the present embodiment, communication is not interrupted and the probability of being able to obtain the correct data from another communication path can be improved, even in the case where one of the communication paths from the control station 101 or another relay station is temporarily disconnected and the data cannot be correctly received. For this reason, for example, it is possible to perform wireless data transmission with a high degree of reliability, even in an environment in which the application of a retransmission procedure is difficult, such as the case of wirelessly transmitting stream data such as an acoustic signal or a video signal for which the period of validity of the data is particularly short.

<Second Embodiment>

In the present embodiment, a configuration shall be described in which the relay apparatus is furthermore selected, or in other words, the transmission path is set, based on the quality of communication between terminals. Control operations according to the second embodiment shall be described with reference to FIGS. 11, 12A-12C, and 17A to 20.

Figure 17A:
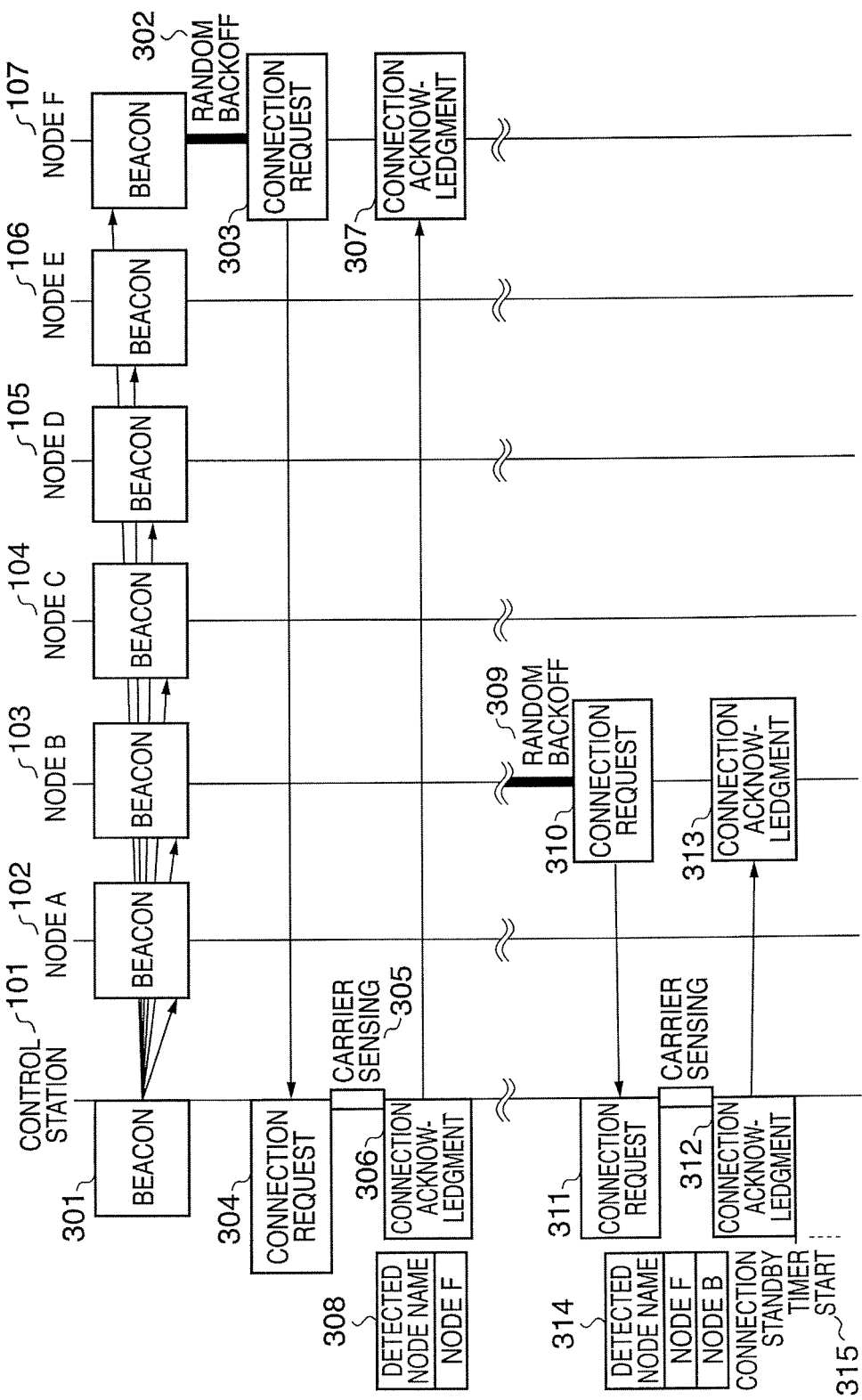
Figure 19A:
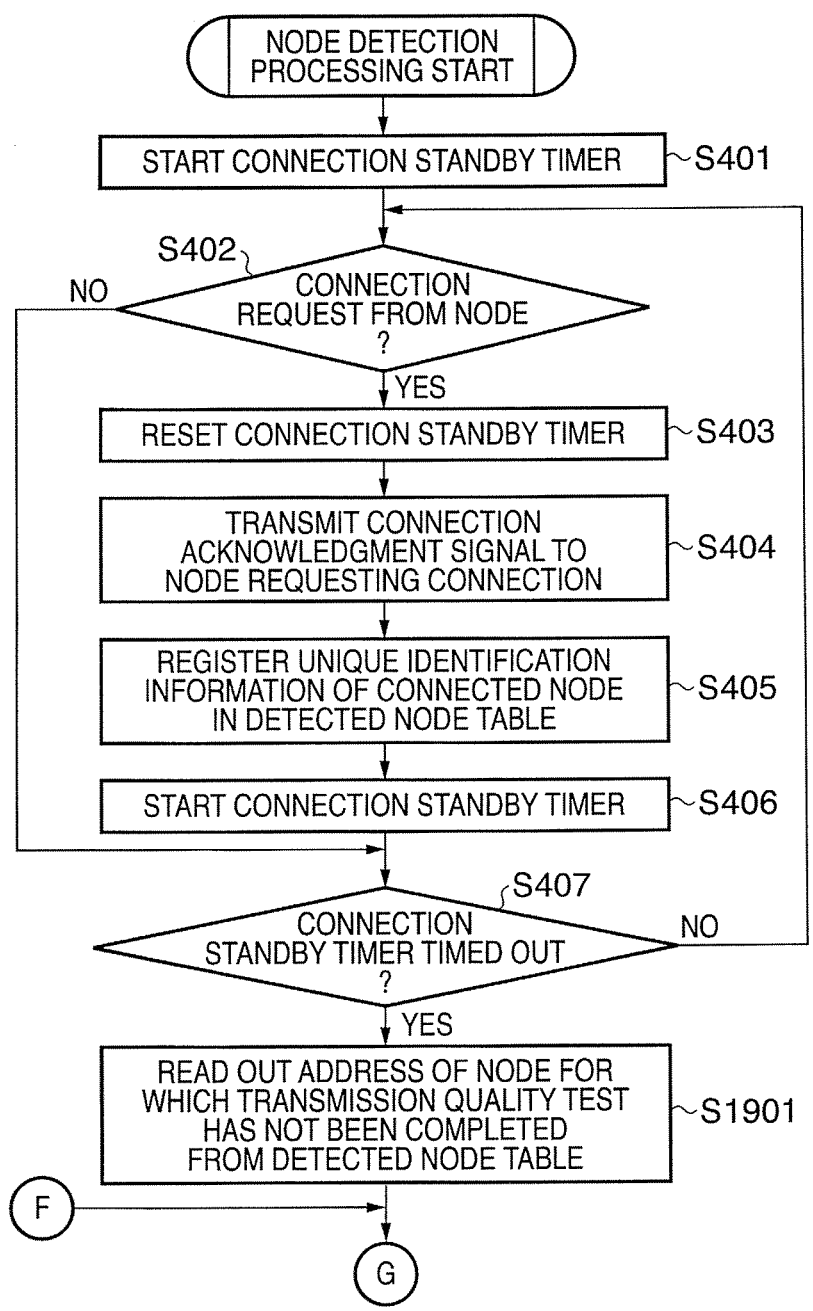
FIGS. 19A and 19B are flowcharts illustrating communication quality measurement processing performed between the control station and nodes.
Figure 19B:
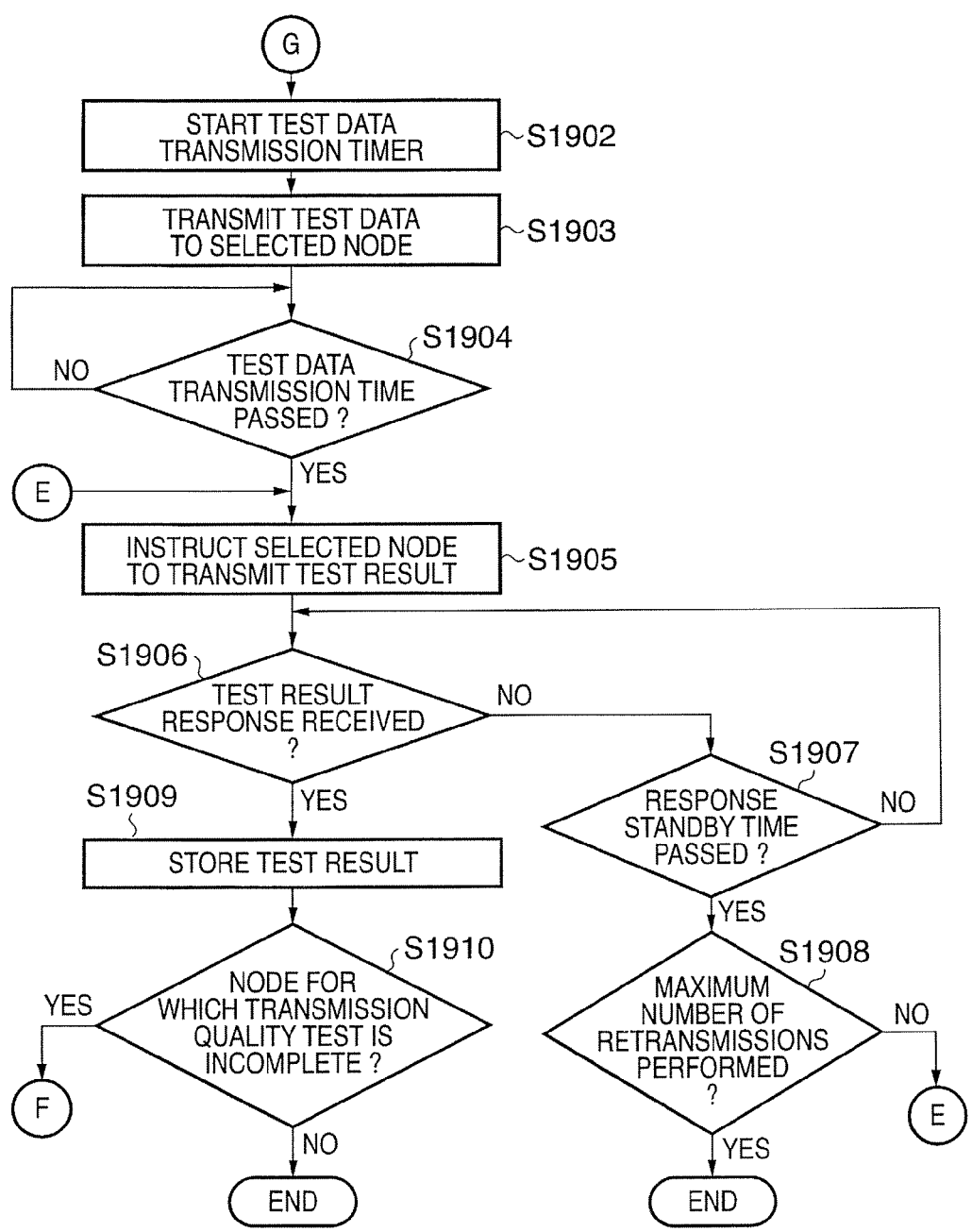
Figure 20:
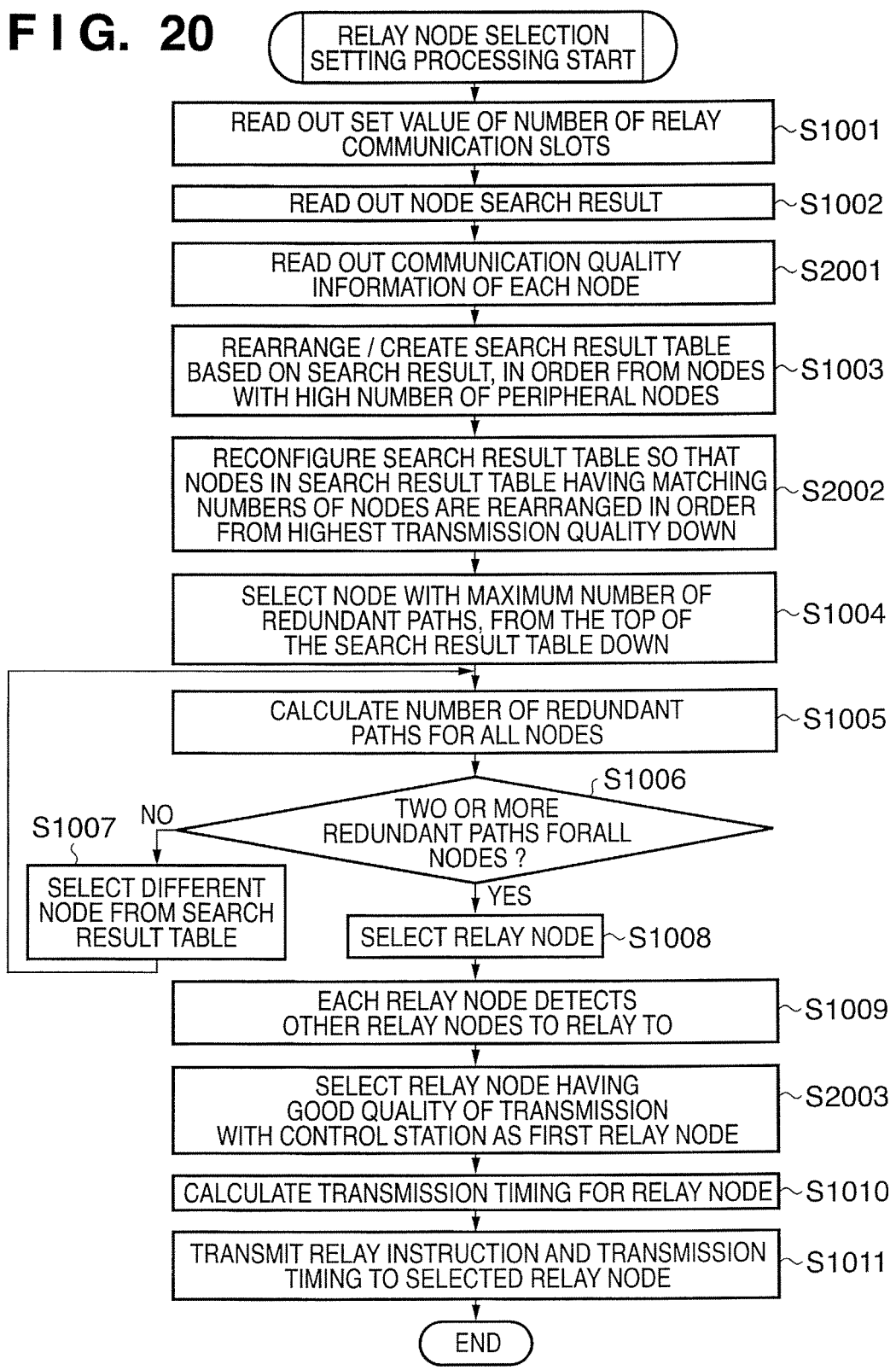
FIG. 20 is a flowchart illustrating a relay node selection setting processing that refers to the communication quality information.

FIGS. 17A and 17B are sequence diagrams illustrating operations for measuring the quality of communication between nodes after the control station 101 has detected the nodes 102 to 107. FIG. 18 is a communication quality measurement result table showing results of the measurement of the quality of communication. FIGS. 19A and 19B are flowcharts illustrating communication quality measurement processing performed between the control station 101 and the nodes 102 to 107. FIG. 20 is a flowchart illustrating a relay node selection setting processing that refers to the communication quality information.

(Description of Communication Quality Measurement Operations)

Hereinafter, the communication quality measurement operations between the control station 101 and the nodes 102 to 107 shall be described with reference to FIGS. 2A, 2B, 13, and 17A to 19B.

First, the control unit 202 of the control station 101 detects nodes capable of wireless communication in the same manner as the procedure of the first embodiment (Step S401 to S407 in FIG. 19A). When the node search is completed through this series of operations, the detected node table 308 is read out, and the node F 107, for which the communication quality measurement is not complete, is detected (Step S1901). Next, when the node F 107 is detected, the unique identification information of the node F 107 is set as the destination address 1305, and a measurement data frame header, in which the number of multiplexed data layers 1311 of the control field 1307 is set at 1, is generated.

Next, a predetermined measurement data transmission time is set in the timer 204, and after the measurement is commenced in Step S1902, the procedure moves to Step S1903. In Step S1903, a measurement data frame that has the header generated earlier is transmitted (1701) via the wireless communication unit 201 until the measurement data transmission time finishes (NO in Step S1904). The node F 107 that receives the measurement data frame 1702 stores reception electric field intensity information of the time at which the frame is received in the memory 209, and also measures the error rate of the data. This error rate measurement can detect the number of errors using error correction code; however, a more simplified measurement can be carried out by dividing the data blocks arranged in the information fields into plural blocks, multiplexing these blocks, and performing FCS 1319 computation on the data blocks. The measurement performed by the node F 107 is carried out until the measurement data frame from the control station ends, and when the reception of this frame ends, a communication quality measurement results table including the frame and the reception electric field intensity level detected earlier is created (1703) and stored in the memory 209.

In this manner, the measurement data frame is transmitted, and when the timer 204 of the control station 101 detects that the measurement data transmission time has timed out (YES in Step S1904), the transmission of the transmission data of the control unit 202 ends. Then, when the transmission of the measurement data frame is completed, the procedure moves to Step S1905, where a measurement result transmission instruction 1704 is transmitted to the node F 107 (1704) and a result response is received, or the request operations are repeated until a result response is received within a maximum retransmission number (Steps S1905 to S1908).

Having received this measurement result transmission instruction 1705, the node F 107 transmits a measurement result signal 1706 including the communication quality measurement result table 1703 stored in the memory 209 to the control station 101. Having received the measurement result signal 1707 (YES in Step S1906), the control station 101 updates the communication quality measurement result table to that shown in FIG. 18 using the information (1708) of the communication quality between itself and the node F 107, and stores the table in the memory 203 (Step S1909); the procedure then moves to Step S1910. In Step S1910, the presence/absence of nodes for which this communication quality measurement has not been completed is detected; in the case where the measurement has been completed for all of the nodes connected to the control station, the processing ends, whereas when there are still nodes for which the measurement is not complete, the aforementioned operations are repeated.

Through this procedure, it is possible to obtain information of the communication quality between all nodes 102 to 107 connected to the control station 101. By using this information as a parameter for determining the selection of the relay node and the allocation of relay communication slots, highly reliable redundant data transmission can be realized.

While the descriptions of the present embodiment discuss a reception electric field intensity 1801 and an error rate 1802, it goes without saying that it is not imperative that both of these pieces of information be present. In addition, although only a single value is shown for each piece of communication quality information, this is for the sake of simplicity; it is also possible to provide plural values, such as a maximum value and a minimum (worst) value, taking into consideration variations in the transmission paths.

(Relay Node Selection Setting Processing Based on Communication Quality Information)

A relay node selection setting operation that refers to the communication quality information shall be described hereinafter with reference to FIGS. 11, 12, 18, and 20.

After the obtainment of the communication quality information as described earlier, the control unit 202 of the control station 101 computes the relay communication slots through the same procedure as in the first embodiment; then, the relay node selection setting procedure is commenced. In the relay node selection setting operation, first, the number of relay communication slots and the peripheral node search result table is read out (Steps S1001, S1002); then, the communication quality measurement result table shown in FIG. 18 is read out (Step S2001). Next, the procedure moves to Step S1003, where the table is reconfigured, the nodes being arranged in order from nodes having higher numbers of peripheral nodes that are capable of wireless communication with down; the procedure then moves to Step S2002.

In Step S2002, the communication quality measurement result table (FIG. 18) is referred to, and the nodes having a matching number of peripheral nodes capable of wireless communication are rearranged in order from nodes with high communication quality; the table is reconfigured based thereupon. Next, nodes are selected from the reconfigured peripheral node search result table from the top down, the number of nodes selected being the same as the number of relay communication slots (Step S1004), and the number of communication paths for all nodes is calculated based on the paths from each node to nodes capable of relay (Step S1005). Next, through the same processing as in the first embodiment, processing for setting two or more communication paths for all nodes is performed (Steps S1005 to S1007), and the relay node is selected in the relay node selection processing (Step S1008). At this time, in the case where the communication path calculation processing has ended due to the maximum calculation number being reached, the relay node having the lowest number of nodes that do not fulfill the conditions is selected.

When the relay node selection is completed, the procedure moves to Step S1009, where the other selected relay nodes 1101 and 1102 (FIG. 11) with which the node selected as the relay node is capable of wireless communication are detected. The procedure then moves to S2003. In Step S2003, the relay node with the highest quality of communication with the control station 101 is selected as a first relay node; then, a single relay node that includes the most other relay nodes is selected, in order, from the results of Step S1009. The allocation order of the relay communication slots is determined in accordance with this selection order. When the relay communication slot allocation is completed, the communication timing allocated to each relay node is calculated, and relay node setting instruction signals 1201, 1207, and 1213 are transmitted to each of the relay nodes. The relay nodes that received the relay node setting instruction signals 1203, 1209, and 1215 transmit relay node setting instruction responses 1204, 1210, and 1216 (1205, 1211, and 1217) to the control station 101. In addition, each relay node sets the relay communication slot information included in the relay node setting instruction signals 1203, 1209, and 1215 in the timer 210 of the relay nodes, and the setting processing is completed thereby.

Here, in the present embodiment, the communication timing is communicated to each of the relay nodes, and the selected relay nodes measure the amount of time from the beacon timing to the timing of relay transmission. However, the communication timing calculated earlier may be managed by the control station 101, and each of the relay nodes may be authorized for transmission in accordance with this timing.

As described thus far, according to the configuration of the present embodiment, the relay apparatus is selected based on the quality of communication between terminals. For this reason, data transmission with even higher reliability is possible.

<Other Embodiments>

Although an embodiment of the present invention has been described in detail above, it is possible for the invention to take on the form of a system, apparatus, program or storage medium. More specifically, the present invention may be applied to a system comprising a plurality of devices or to an apparatus comprising a single device.

It should be noted that there are cases where the object of the invention is attained also by supplying a program, which implements the functions of the foregoing embodiments, directly or remotely to a system or apparatus, reading the supplied program codes with a computer of the system or apparatus, and then executing the program codes.

Accordingly, since the functions of the present invention are implemented by computer, the program codes per se installed in the computer also fall within the technical scope of the present invention. In other words, the present invention also covers the computer program itself that is for the purpose of implementing the functions of the present invention.

In this case, so long as the system or apparatus has the functions of the program, the form of the program, e.g., object code, a program executed by an interpreter or script data supplied to an operating system, etc., does not matter.

Examples of storage media that can be used for supplying the program are a floppy (registered trademark) disk, hard disk, optical disk, magneto-optical disk, CD-ROM, CD-R, CD-RW, magnetic tape, non-volatile type memory card, ROM, DVD (DVD-ROM, DVD-R), etc.

As for the method of supplying the program, a client computer can be connected to a website on the Internet using a browser possessed by the client computer, and the computer program per se of the present invention or a compressed file that contains an automatic installation function can be downloaded to a recording medium such as a hard disk. Further, the program of the present invention can be supplied by dividing the program code constituting the program into a plurality of files and downloading the files from different websites. In other words, a WWW server that downloads, to multiple users, the program files that implement the functions of the present invention by computer also is covered by the present invention.

Further, it is also possible to encrypt and store the program of the present invention on a storage medium such as a CD-ROM, distribute the storage medium to users, allow users who meet certain requirements to download decryption key information from a website via the Internet, and allow these users to run the encrypted program by using the key information, whereby the program is installed in the user computer. Further, besides the case where the aforesaid functions according to the embodiment are implemented by executing the read program by computer, an operating system or the like running on the computer may perform all or a part of the actual processing so that the functions of the foregoing embodiment can be implemented by this processing.

Furthermore, after the program read from the storage medium is written to a memory provided in a function expansion board inserted into the computer or a function expansion unit connected to the computer, a CPU or the like mounted on the function expansion board or function expansion unit performs all or a part of the actual processing so that the functions of the foregoing embodiment can be implemented by this processing.

Thus, in accordance with the present invention, as described above, it is possible to provide a technique through which the confidentiality of print data can be maintained even under such circumstances as interruption of power.

As many apparently widely different embodiments of the present invention can be made without departing from the spirit and scope thereof, it is to be understood that the invention is not limited to the specific embodiments thereof except as defined in the appended claims.

According to the present invention, it is possible to provide a technique that prevents data loss stemming from changes in the communication environment and that is capable of transmitting data wirelessly with high reliability, in a system in which data is transmitted wirelessly from a control station to plural communication apparatuses.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-316325, filed Nov. 22, 2006, which is hereby incorporated by reference herein in its entirety.

What is claimed is:

1. A communication apparatus, comprising:
   a receiving unit configured to receive first data from a first other communication apparatus and receive second data from a second other communication apparatus;
   a determination unit configured to determine, in a case where each of the first data and the second data includes an error, whether or not the error is correctable based on the first data and the second data
   a processing unit configured to perform an error correction process based on the first data and the second data in a case where the determination unit determines that the error is correctable; and
   a transmission unit configured to transmit data, on which the error correction process is performed by the processing unit, to a third other communication apparatus in a case where each of the first data and the second data includes an error and the error is correctable based on the first data and the second data, and to transmit the first data or the second data, on which the error correction process is not performed by the processing unit, to the third other communication apparatus in a case where at least one of the first data or the second data does not include an error or the error is not correctable based on the first data and the second data.

2. The communication apparatus according to claim 1, wherein the transmission unit transmits the data, on which the error correction process is performed by the processing unit, or the first data or the second data, on which the error correction process is not performed by the processing unit, to a plurality of the third other communication apparatuses.

3. The communication apparatus according to claim 1, wherein the data transmitted by the transmission unit includes data addressed to the first other communication apparatus and data addressed to the second other communication apparatus.

4. The communication apparatus according to claim 1, further comprising a sending unit configured to send identification information of another communication apparatus with which the communication apparatus is capable of communication.

5. The communication apparatus according to claim 1, wherein the transmission unit transmits the data, on which the error correction process is performed by the processing unit, or the first data or the second data, on which the error correction process is not performed by the processing unit, in a case where a control apparatus, which controls a wireless communication system comprising the communication apparatus, instructs the communication apparatus to relay data.

6. The communication apparatus according to claim 1, further comprising a second determination unit configured to determine whether or not the data received by the receiving unit includes an error,
wherein the processing unit performs the error correction process on the data received by the receiving unit in a case where the second determination unit determines that the data received by the receiving unit includes an error and the determination unit determines that the error is correctable.

7. A control method for a communication apparatus, the control method comprising:
receiving first data from a first other communication apparatus;
receiving second data from a second other communication apparatus;
determining, in a case where each of the first data and the second data includes an error, whether or not the error is correctable based on the first data and the second data
performing an error correction process based on the first data and the second data in a case where it is determined that the error is correctable;
transmitting data, on which the error correction process is performed, to a third other communication apparatus in a case where each of the first data and the second data includes an error and the error is correctable based on the first data and the second data; and
transmitting the first data or the second data, on which the error correction process is not performed, to the third other communication apparatus in a case where at least one of the first data or the second data does not include an error or the error is not correctable based on the first data and the second data.

8. A non-transitory computer-readable storage medium storing a program that, when executed by a processor, implements a control method for a communication apparatus, the control method comprising:
receiving first data from a first other communication apparatus;
receiving second data from a second other communication apparatus;
determining, in a case where each of the first data and the second data includes an error, whether or not the error is correctable based on the first data and the second data
performing an error correction process based on the first data and the second data in a case where it is determined that the error is correctable;
transmitting data, on which the error correction process is performed, to a third other communication apparatus in a case where each of the first data and the second data includes an error and the error is correctable based on the first data and the second data; and
transmitting the first data or the second data, on which the error correction process is not performed, to the third other communication apparatus in a case where at least one of the first data or the second data does not include an error or the error is not correctable based on the first data and the second data.

* * * * *